US008087235B2

(12) United States Patent  
Strehlau et al.

(10) Patent No.: US 8,087,235 B2
(45) Date of Patent: Jan. 3, 2012

(54) PROCESS FOR THE REMOVAL OF HARMFUL SUBSTANCES FROM EXHAUST GASES OF COMBUSTION ENGINES AND CATALYST FOR CARRYING OUT SAID PROCESS

(75) Inventors: Wolfgang Strehlau, Dossenheim (DE); Olga Gerlach, Ludwigshafen (DE); Jürgen Maier, Mannheim (DE)

(73) Assignee: hte Aktiengesellschaft the high throughput experimentation company (DE)

( * ) Notice: Subject to any disclaimer, the term of this patent is extended or adjusted under 35 U.S.C. 154(b) by 984 days.

(21) Appl. No.: 11/578,184

(22) PCT Filed: Apr. 14, 2005

(86) PCT No.: PCT/EP2005/003948
§ 371 (c)(1),
(2), (4) Date: Nov. 22, 2006

(87) PCT Pub. No.: WO2005/099873
PCT Pub. Date: Oct. 27, 2005

(65) Prior Publication Data
US 2008/0034740 A1 Feb. 14, 2008

(30) Foreign Application Priority Data

Apr. 16, 2004 (DE) .......... 10 2004 018 648
Dec. 2, 2004 (DE) .......... 10 2004 058 210

(51) Int. Cl.
F01N 3/00 (2006.01)
B01D 47/00 (2006.01)
B01D 53/34 (2006.01)
B01D 53/56 (2006.01)
B01D 53/94 (2006.01)
B01D 50/00 (2006.01)
B01J 8/00 (2006.01)
B01J 19/00 (2006.01)
C01B 23/00 (2006.01)
C01B 25/00 (2006.01)
C01B 31/00 (2006.01)
C01B 33/00 (2006.01)
C01B 35/00 (2006.01)
C01G 28/00 (2006.01)
C01G 30/00 (2006.01)
B03C 3/00 (2006.01)

(52) U.S. Cl. .... 60/286; 423/212; 423/213.2; 423/213.5; 422/172

(58) Field of Classification Search .................. 423/212, 423/213.2, 213.5; 422/167–176
See application file for complete search history.

(56) References Cited

U.S. PATENT DOCUMENTS
4,782,039 A 11/1988 Lindsey
(Continued)

FOREIGN PATENT DOCUMENTS
DE 19909933 9/2000
(Continued)

OTHER PUBLICATIONS
International Search Report for PCT/EP2005/003948.
(Continued)

Primary Examiner — Thomas Denion
Assistant Examiner — Michael Carton
(74) Attorney, Agent, or Firm — Jones Day

(57) ABSTRACT

The present invention relates to an integrated system for the treatment of exhaust gases, which preferably consists of at least one $NO_x$-storing component, at least one in situ ammonia-generating component, at least one ammonia-storing component and at least one ammonia ($NH_3$)-SCR-component, as well as to a process for the treatment of exhaust gas comprising at least the steps (i) storing of $NO_x$ under lean exhaust gas conditions in at least one $NO_x$-storing component; (ii) in situ conversion of the stored $NO_x$ to ammonia ($NH_3$) under rich exhaust gas conditions; (iii) storing of the ammonia ($NH_3$) in at least one $NH_3$-storing component under rich exhaust gas conditions as well as the (iv) reaction of $NH_3$ with $NO_x$ under lean exhaust gas conditions. Thereby, the partial steps "storing of $NO_x$" and "conversion of $NH_3$ with $NO_x$" are carried out at least partially and/or temporarily simultaneously and/or parallelly. Furthermore, preferred catalysts are disclosed for carrying out the process.

24 Claims, 13 Drawing Sheets

U.S. PATENT DOCUMENTS

| | | | |
|---|---|---|---|
| 5,316,993 | A | 5/1994 | Sextl et al. |
| 5,451,387 | A | 9/1995 | Farnos et al. |
| 5,863,508 | A * | 1/1999 | Lachman et al. ............ 422/171 |
| 6,004,521 | A | 12/1999 | Miyoshi et al. |
| 6,176,079 | B1 | 1/2001 | Konrad et al. |
| 6,338,244 | B1 | 1/2002 | Guenther et al. |
| 6,350,421 | B1 | 2/2002 | Strehlau et al. |
| 6,685,900 | B2 | 2/2004 | Domesle et al. |
| 6,689,709 | B1 | 2/2004 | Tran et al. |
| 6,725,647 | B2 | 4/2004 | Pfeifer et al. |
| 7,431,895 | B2 | 10/2008 | Pfeifer et al. |
| 2001/0053745 | A1 * | 12/2001 | Kharas et al. ................. 502/332 |
| 2002/0033015 | A1 | 3/2002 | Schaffner et al. |
| 2002/0048542 | A1 | 4/2002 | Deeba et al. |
| 2002/0116920 | A1 | 8/2002 | Pfeifer et al. |
| 2004/0076565 | A1 | 4/2004 | Gandhi et al. |
| 2007/0110650 | A1 | 5/2007 | Pfeifer et al. |

FOREIGN PATENT DOCUMENTS

| | | |
|---|---|---|
| DE | 10036886 | 2/2002 |
| DE | 10113947 | 9/2002 |
| EP | 0072397 | 5/1982 |
| EP | 0716876 | 6/1996 |
| EP | 0730901 | 9/1996 |
| EP | 0970737 | 1/2000 |
| EP | 0982066 | 3/2000 |
| EP | 1010454 | 6/2000 |
| EP | 1016447 | 7/2000 |
| EP | 1036591 | 9/2000 |
| EP | 1129764 | 9/2001 |
| EP | 1317953 | 6/2003 |
| EP | 1559892 | 8/2005 |
| EP | 1685891 | 8/2006 |
| GB | 1425481 | 2/1976 |
| GB | 2375059 | 11/2002 |
| JP | 2002-153755 | 5/2002 |
| WO | WO97/17532 | 5/1997 |
| WO | 2005/099873 | 10/2005 |

OTHER PUBLICATIONS

Written Opinion of the International Searching Authority for PCT/EP2005/003948.

International Preliminary Examination Report for PCT/EP2005/003948.

Wolfgang Held, et al, SAE International Technical Paper Series Paper No. 900496, entitled "Catalytic NOx Reduction in Net Oxidizing Exhaust Gas", published by SAE International the Engineering Society for Advancing Mobility Land Sea Air and Space, 1990.

Naoto Miyoshi, et al, SAE International Technical Paper Series Paper No. 950809 entitled "Development of New Concept Three-Way Catalyst for Automotive Lean-Burn Engines", published by SAE International The Engineering Society for Advancing Mobility Land Sea Air and Space, 1995.

Original German language and partial English translation of Office Action issued by the German Patent Office dated Apr. 15, 2005 for German Patent Application No. 10 2004 018 648.0-43.

Jacob, Eberhard, Perspectives on Mobile SCR Technology, Chapter 15, Aachener Kolloquium Fahrzeug—und Motorentechnik 2006, pp. 1 thru 32.

Original German language and partial English translation of Office Action issued by the German Patent Office dated Jun. 13, 2007 for German Patent Application No. 10 2004 018 648.0-43.

Partial English translation of Office Action issued by the Japanese Patent Office dated Apr. 16, 2010 for Japanese Patent Application No. 2007-507758.

Partial English translation of Office Action issued by the Japanese Patent Office dated Oct. 14, 2010 for Japanese Patent Application No. 2007-507758.

* cited by examiner

PROCESS FOR THE REMOVAL OF HARMFUL SUBSTANCES FROM EXHAUST GASES OF COMBUSTION ENGINES AND CATALYST FOR CARRYING OUT SAID PROCESS

The invention relates to an integrated system for the treatment of exhaust gases, which preferably consists of at least one $NO_x$-storing component, at least one in situ ammonia-generating component, at least one ammonia-storing component and at least one ammonia ($NH_3$)-SCR-component (in the following also: SCR-component), as well as to a process for the treatment of exhaust gases by using such a system. The invention also relates to a catalyst for the removal of harmful substances including nitric oxides from exhaust gases of combustion engines, in particular from exhaust gases of lean engines in the cyclic lean-rich operational mode. Another object of the invention relates to a process for the manufacture of said catalyst. Other objects of the invention are catalyst systems, which include the catalyst as well as processes for the removal of harmful substances from exhaust gases of combustion engines containing nitric oxides, in particular from exhaust gases of lean engines in the cyclic lean-rich operational mode by using said catalyst. Thereby, a process runs in the catalyst, which includes the storage of nitric oxides in a $NO_x$-storing component, the reduction of the nitric oxides to ammonia, the storage of ammonia in an ammonia-storing component and the oxidation of ammonia with $NO_x$ to nitrogen.

A particular embodiment of three-way catalytic converters for the removal of harmful substances from lean combustion engines, preferably from engines of passenger cars, are $NO_x$-storing catalysts. By means of the engine management system, said catalysts are alternately exposed to rich and lean exhaust gases conditions. During the lean operational mode, they store the nitric oxides $NO_x$ which are generated during combustion. The stored nitric oxides are subsequently catalytically decomposed in the course of a complicated engine management system with a complex program within short "enrichment phases" (that means lack of oxygen) under then reducing conditions to nitrogen. Accordingly, such catalysts are also denominated as "$NO_x$-adsorbers" or also as "$NO_x$-storing/reducing catalysts".

The function of $NO_x$-storing catalysts is described in detail in the SAE document SAE 950809.

$NO_x$-storing catalysts work dependent on the used $NO_x$-storing means in specific "temperature windows", typically between 200 and 500° C. During thermal aging of the $NO_x$-catalysts, the breadth of the temperature window is narrowed. The limited temperature window is a problem for the use in Diesel engines, wherein a high low-temperature activity is desired, as well as for lean Otto engines, which predominantly require a high high-temperature activity. Another problem of conventional $NO_x$-storing catalysts is that during the enrichment phases, which are necessary for reducing the stored nitric oxides, high secondary emissions can occur, for example in form of $NH_3$ and $H_2S$.

SCR-processes (selective catalytic reduction) for the decomposition of $NO_x$ by using $NH_3$ as selectively reducing agent, are also known from the state of the art.

Said SCR-process is a process with high efficiency in order to reduce $NO_x$ emissions. For example, SCR-processes are used in stationary combustion facilities. In SCR-processes, nitric oxides are reacted by means of ammonia as selectively reducing agent to $N_2$. The stoichiometry of the SCR-reaction, that means the ratio of molar amounts of $NH_3$ and $NO_x$, which are necessary to achieve an approximately complete $NO_x$ conversion, inter alia depends on the reaction temperatures and the catalysts to be used. In general, it can be stated that the molar amounts of ammonia have to be in the same range as the amounts of the nitric oxides in order to ensure high conversions.

In U.S. Pat. No. 4,782,039 and U.S. Pat. No. 5,451,387 high $NO_x$ conversions are found at molar $NH_3/NO_x$ ratios in the range of from 0.75-1.25. In practical experience, the maximum molar $NH_3/NO_x$ ratio, which has to be adjusted, is inter alia limited by the $NH_3$ breakthrough (so-called "ammonia slip"), which increases with increasing $NH_3/NO_x$ ratio.

DE 199 09 933 A1 discloses a process for the operation of a facility for the purification of exhaust gases with internal ammonia generation. In one embodiment of the DE 199 09 933 A1, the generation of ammonia is carried out by means of combustion sources, which are controlled separately. At least one of the combustion sources generates a rich exhaust gas, which is guided over a catalyst for generating ammonia. The ammonia which is generated in this manner, is fed into the exhaust gas flow of the lean combustion sources, which contains the $NO_x$. By means of a catalyst for reducing nitric oxide, $NO_x$ and $NH_3$ are converted to $N_2$.

Said embodiment is limited in the practical realization, because the $NH_3$ amount, which is generated at the catalyst for generating ammonia, and the amount of $NH_3$, which is present in the other flow, have to be present always in a specific stoichiometry, because elsewise either $NH_3$ or $NO_x$ would be emitted in an increased concentration.

In another embodiment of the DE 199 09 933 A1, a $NO_x$-adsorbing catalyst, an ammonia-reducing catalyst and a nitric oxide-reducing catalyst are switched sequentially. So, the nitric oxides, which in the lean operational mode of the combustion sources are augmentedly contained in the exhaust gases, can be buffered in the nitric oxide-adsorbing catalyst, and can be desorbed in a respective subsequent rich operational mode, and can be used at least partially in the following ammonia-generating catalyst for the generation of ammonia. Thereby that the catalysts are switched sequentially, a simultaneous storage of nitric oxides under lean exhaust gas conditions and a reaction of ammonia with the nitric oxides is not possible.

Another exhaust gas purification of this type is disclosed in the WO 97/17532. In this document, different arrangements of catalysts are described, wherein each catalyst has a specific function. In one of the embodiments, an ammonia-generating catalyst, a $NO_x$-adsorbing catalyst, a $NH_3$-storing catalyst and another catalyst are switched sequentially. Such an arrangement is well suited to suppress secondary emission in form of $NH_3$. Additionally, $NO_x$ which is not longer stored by the $NO_x$-adsorbing catalyst, can be reduced in the added ammonia-adsorbing catalyst by desorption of ammonia. Thus, two different processes for reducing $NO_x$ are running sequentially towards each other: at first, the $NO_x$ is stored at the storage catalyst; if said catalyst is filled, then $NO_x$, which breaks through, can be degraded with the $NH_3$ to $N_2$. With said system, $NO_x$ and $NH_3$ breakthroughs can be lowered in the lean as well as in the rich operational mode. But a simultaneous storing and reducing of nitric oxides is here not possible.

In US 2002/0116920 A1 a process for treating exhaust gases is described, wherein a $NH_3$-generating catalyst, an oxidation catalyst and a SCR-catalyst are arranged sequentially. During the rich operational mode, $NH_3$ is generated by means of the $NH_3$-generating catalyst. Said ammonia is stored on the SCR-catalyst. During lean operational mode, the SCR catalyst converts the before stored $NH_3$ with the $NO_x$, which is emitted from the engine, to $N_2$. The oxidation catalyst increases the efficiency of the SCR-catalyst by oxidation of the NO to $NO_2$.

The process which is described in the US 2002/0116920 A1 has the drawback that the stoichiometry, which is necessary for the efficient conversion of $NO_x$ by means of the SCR-reaction between $NO_x$ and $NH_3$ during the real operation can be complied with only in a highly technical complexity and considerable excess consumption of fuel. Thus, during the rich operational mode, the formation of nearly the same molar amount of $NH_3$ would be due as would be emitted in the subsequent lean operational mode. However, this means that relatively long rich phases would have be to realized, what inevitably leads to increased fuel consumption and increased CO and HC emissions.

As a rule, the catalysts which are mostly used in the processes of the prior art, comprise an active metal component as well as a $NO_x$-storing component, which mostly contains an oxide of the alkali metal elements, of the earth alkali metal elements or the rare earth elements.

Mostly, as active metal, platinum is employed. An essential function of the active metal is to oxidize NO in the lean phase to $NO_2$. The so formed $NO_2$ is usually stored with the oxidic $NO_x$-storing component in form of nitrate or nitrite. In case that with increasing saturation of the $NO_x$-storing component by means of nitrate (nitrite) the $NO_x$ conversion performance is reduced to an unacceptable level, then, by means of internal actions of the engine, an enrichment of the exhaust gas takes place. Said enrichment causes the abrupt decomposition of the nitrates (nitrites) and deliberation of $NO_x$. Because during the enrichment enough reducing agent and furthermore only few oxygen is present, the $NO_x$ can be reduced directly with carbon monoxide (CO) and hydrocarbons (HC) to $N_2$. In order to accelerate said reduction, $NO_x$-storing catalysts contain additionally to platinum mostly also low amounts of rhodium. Platinum as well as rhodium are present on temperature stable, mostly highly porous carrier oxides like the oxides of the Al, Si, Zr or Ti or mixtures thereof. In particular, aluminum oxide often is used as carrier for platinum. $NO_x$-storing catalysts of the prior art are for example disclosed in EP 1 317 953 A1, EP 0 716 876 B1, EP 0 730 901 B1, US 2002/0048542 A1, EP 0 982 066 A1, DE 100 36 886 A1, EP 1 010 454 A2, U.S. Pat. No. 6,004,521, EP 1 036 591 A1.

In particular the active metal components and additives, which are contained in the $NO_x$-storing catalyst, as for example oxygen-storing materials, which are mostly based on cerium zirconium oxide, ensure that also carbon monoxide (CO) and hydrocarbons (HC) can be effectively reacted under rich as well as stoichiometrical and lean exhaust gas conditions to carbon dioxide and water. In the same manner, the reaction of $NO_x$ to $N_2$ under rich and stoichiometrical exhaust gas conditions is successful.

From DE 101 13 947 B4 also already a process for the lowering of the nitric oxide content in the exhaust gas of a combustion engine is known, which can be run in the alternating lean-rich operational mode, wherein a starting catalyst, a $NO_x$-storing catalyst and a SCR-catalyst are arranged sequentially. Herewith, nitric oxides are reduced to ammonia under rich exhaust gas conditions at a $NO_x$-storing catalyst and a starting catalyst. In another step, the nitric oxides react at the SCR-catalyst with so formed ammonia to nitrogen. By means of appropriate adjustment of the engine management system, thereby the required reduction conditions (rich operational mode) respectively oxidation conditions (lean operational mode) are adjusted for the individual steps.

It is already known using zeolites in catalysts for the purification of exhaust gases of cars.

U.S. Pat. No. 6,689,709 B1 discloses a hydrothermally stable zeolite-β, which contains iron and cerium, which catalyses the reduction of $NO_x$ with ammonia (ammonia-SCR-reaction (selective catalytic reduction by ammonia)). Thereby, the process for the reduction of $NO_x$ plans that ammonia is permanently metered to the exhaust gas flow.

U.S. Pat. No. 6,004,521 discloses the use of a zeolite in $NO_x$-storing catalysts for exhaust gases from engines, which are run in the conventional rich-lean cycle. Thereby, the zeolite serves as carrier for the active metal. Thereby, the process for the reduction of $NO_x$ plans that the stored $NO_x$ reacts in the moment of the enrichment with the hydrocarbons and CO to $N_2$. Thus, no formation of $NH_3$ and buffering within the zeolite takes place.

EP 0 970 737 A2 discloses a catalyst, which comprises a carrier including a zeolite and a metal oxide as well as a storing and a deliberating component and a noble metal, which is outside of the pores of the zeolite. Herewith, the zeolite has to serve merely as carrier for the active metal.

The EP 1 129 764 A1 discloses catalysts for the purification of the exhaust gases of Diesel engines containing at least one zeolite as well as additionally at least one of the carrier oxides aluminum oxide, silicon oxide, titanium oxide, zirconium oxide and alumina silicate as well as the mixed oxides thereof, and at least one of the noble metals platinum, palladium, rhodium, iridium, gold or silver.

The EP 0 970 737 A2 and the technical document SAE 900496 disclose zeolites for the direct conversion of $NO_x$ with hydrocarbons in the sense of the so-called HC-SCR (selective catalytic reduction by hydrocarbons). Thereby, corresponding to the $NH_3$-SCR process, it is a continuously working process, wherein $NO_x$ is directly reduced with a hydrocarbon to $N_2$. In this connection, transition metal-exchanged and noble metal-exchanged or loaded zeolites like ZSM-5 and zeolite-β are employed.

One object of the invention was to develop a process for the treatment of exhaust gas for the removal of $NO_x$ from exhaust gases from lean engines, which are operated in the cyclic rich-lean operational mode, the efficiency of which for the removal of $NO_x$ and for the reduction of the secondary emissions is higher than those of the catalysts from the prior art.

Another object of the invention was to provide a catalyst for the removal of harmful substances containing nitric oxides from exhaust gases from combustion engines, in particular from exhaust gases from lean engines in the cyclic lean-rich operational mode, whereby by using said catalyst a simplified and more effective process for the lowering of the harmful substance content in the exhaust gases of said engines should be achieved with respect to the prior art.

One object of the invention is achieved by means of a process which in a preferred embodiment comprises at least the following partial steps:
(i) storing of $NO_x$ under lean exhaust gas conditions in at least one $NO_x$-storing component;
(ii) in situ conversion of the stored $NO_x$ to ammonia ($NH_3$) under rich exhaust gas conditions;
(iii) storing of $NH_3$ in at least one $NH_3$-storing component under rich exhaust gas conditions;
(iv) reaction of $NH_3$ with $NO_x$ under lean exhaust gas conditions.

Thereby, the partial steps "storing of $NO_x$" and "reaction of $NH_3$ with $NO_x$" are preferably carried out at least partially and/or temporarily simultaneously and/or parallelly.

The process of the invention is characterized by a high $NO_x$ conversion rate over a broad temperature range.

Preferably, the process of the invention is used for the lowering of $NO_x$ emissions from Otto and Diesel engines from motor cars, which are operated in a lean manner.

Another object of the invention is also solved by an integrated catalyst system, wherein at least two different components have at least the following functionalities: (i) $NO_x$-storing under lean exhaust gas conditions, (ii) in situ reduction of the stored $NO_x$ to ammonia ($NH_3$) under rich exhaust gas conditions, (iii) storing of the $NH_3$ in a $NH_3$-storing means under rich exhaust gas conditions, (iv) reaction of $NH_3$ with $NO_x$ under lean exhaust gas conditions. The components of the system are combined functionally and preferably also locally, preferably in direct contact with each other as well as further preferred on a contiguous substrate or a jointed substrate respectively on or in a common substrate.

The system of the invention for treating exhaust gases (in the following also named as "system") is suitable for the removal of nitric oxides ($NO_x$) from exhaust gases, preferably from exhaust gases from engines, under cyclic rich/lean conditions.

The integrated catalyst system of the invention is composed of at least two components with at least the functionalities (i) to (iv). Besides, the catalyst system can have any number of other components with any further functionality. Each individual component can in turn be composed of components, for example of carrier components and active components.

According to the invention, the above described $NO_x$-storing technology is combined with the above described SCR-technology in an integrated system for the treatment of an exhaust gas. Thereby, the ammonia, which is necessary for the SCR-process, is gained not exclusively, however in a considerable amount from the nitric oxides, which are bound in the $NO_x$-storing component, i.e. in situ. An additional feed of ammonia from outside in any amount is thereby possible.

The term (catalyst) component means within the scope of the present document any material, which has at least one of the functionalities, which are necessary for the effect of the integrated catalyst system.

In the scope of the present invention, the term $NO_x$ conversion performance shall mean the degree for the removal of a certain amount of $NO_x$ per time unit as function of the exhaust gas composition, the exhaust gas temperature, the oxygen partial pressure, the $NO_x$ engine emission, the exhaust gas volume flow and the operation time in the lean operational mode of a system for the treatment of an exhaust gas.

The term lean operation time shall mean the duration of the time, wherein the system for the treatment of an exhaust gas is uninterruptedly exposed to a lean exhaust gas. The lean operation time is an important factor for the fill-level of the $NO_x$-storing catalyst, that means the integral amount of $NO_x$, which is adsorbed by the $NO_x$-storing catalyst.

As essential criteria for the classification of engine types as well as of catalysts, serves the ratio of air to fuel expressed by means of the "air number" $\lambda$. Thereby, a value of $\lambda=1.0$ corresponds exactly to the stoichiometrical ratio of fuel to dry air, that means that there is just enough air within the combustion space so that all fuel can be burnt stoichiometrically to carbon dioxide and water.

Lean exhaust gas is an exhaust gas with an air number $\lambda>1$, and rich exhaust gas is an exhaust gas with an air number $\lambda<1$. In the sense of a minimization of fuel consumption, in general, enrichment periods as short as possible, enrichment levels as low as possible and lean periods as long as possible are aimed for. Inter alia, rich-lean period ratios and enrichments levels depend strongly on the $NO_x$-conversion performance and the $NO_x$ regeneration ability of the systems for the treatment of an exhaust gas. During an enrichment phase, combustion engines emit increased amounts of carbon monoxide (CO) and hydrogen ($H_2$) and additionally hydrocarbons (HC). These components, which are reducing, reduce the nitric oxides to nitrogen and ammonia, and thereby are decomposed themselves to carbon dioxide ($CO_2$) and water ($H_2O$).

Another reason to prefer enrichment periods as low as possible and enrichment levels as low as possible is that breakthroughs of CO and HC as well as increased secondary emission, for example in form of $NH_3$, $H_2S$ and COS, have to be minimized.

According to a preferred embodiment of the system of the invention, at least one $NO_x$-storing component, at least one in situ ammonia-generating component, at least one ammonia-storing component and at least one SCR-component have to be integrated spatially and/or functionally in a manner that a high $NO_x$ conversion performance is ensured by means of a simultaneous course of $NO_x$-storing and SCR-reaction, and that thereby preferably secondary emissions in form of $NH_3$ are minimized.

Despite the high complexity of the system for the treatment of an exhaust gas of the invention, it is in another preferred embodiment possible to combine all necessary (catalytic) components for the design of the system on a common or a contiguous substrate respectively a jointed substrate, and therewith to provide an efficient and cost-saving system for the treatment of an exhaust gas. The integration of the (catalytic) components ($NO_x$-storing component, in situ ammonia-generating component, $NH_3$-storing component, SCR-component) on a common substrate, preferably in form of a monolithic honeycomb body, is preferably achieved in a manner that the before mentioned components are simultaneously or sequentially applied onto a common substrate, preferably by means of known washcoat processes.

The $NO_x$-storing component, which is used according to the invention, can be composed basically from the known noble metal components and/or storing means, which are known from the prior art.

Fundamentally, as $NO_x$-storing means, all materials are suitable, which are able for their chemical, preferably basic properties, to store nitric oxide respectively to adsorb nitric oxides, whereby the stored nitric oxides must be stable under the appropriate temperature conditions. Consequently, preferably compounds of the alkali metals (Na, K, Rb, Cs), of the earth alkali metals (Mg, Ca, Sr, Ba), of the rare earth metals (La, Ce, Pr, etc.) and of zirconium are used as storing materials, as for example in form of oxides, hydroxides or carbonates thereof. As active metal components, platinum metals (Pt, Pd, Rh, Ru, Ir) are preferred, which are applied onto porous carrier oxides.

During the lean operational mode, the function of the $NO_x$-storing component is to store the $NO_x$, which is emitted by the combustion engine. In case that the $NO_x$-conversion performance drops to an unacceptable level due to the increasing saturation of the $NO_x$-component with $NO_x$, then, by means of internal actions of the engine, an enrichment of the exhaust gas is carried out. Due to the enrichment, the stored $NO_x$ is reduced. To which extent an unacceptable $NO_x$-storing level is achieved, can be determined preferably by using a $NO_x$ sensor, which is installed downstream to the system for the treatment of an exhaust gas according to the invention.

When using systems for the treatment of an exhaust gas, which are provided with $NO_x$-storing catalysts, the enrichment should lead to a reduction of the nitric oxide to $N_2$ as selective as possible. The formation of $NH_3$ is not desired in these systems.

However, the present invention has the aim to form $NH_3$ during the enrichment phase. Contrary to the documents which are mentioned in the prior art, thus, the $NH_3$ formation is carried out mainly or at least predominantly from the nitric oxides, which are stored in the $NO_x$-storing component before.

The process according to the invention, inter alia, is characterized in that within a very short time slice $NH_3$ can be generated, because the amount of $NO_x$, which was accumulated over a longer period, that is the one of the previous lean phase, can be employed for the reduction to ammonia.

The high selective reduction of the nitric oxides to $N_2$ during the enrichment phases is not mandatory within the scope of the present invention, in principle even not desired. On one hand, an efficient reduction of $NO_x$ to $NH_3$ can be controlled by means of the amount of the emitted hydrogen ($H_2$) and carbon monoxide (CO) during the enrichment, and on the other hand by means of an optimized catalyst formulation.

Preferably, additionally one of the active metal components which are present in the $NO_x$-storing component has the function of the in situ ammonia-generating component or the function of generating ammonia.

It has to be mentioned that the ammonia does not have to originate exclusively from the nitric oxides, which are stored in the $NO_x$-storing component, but can additionally be formed in inferior or at least low amount (<50%, preferably <20%) from those nitric oxides, which are emitted from the engine during the enrichment phases.

The ammonia which is formed in this manner, is now stored in an appropriate $NH_3$-storing component. Preferably, the $NH_3$-storing component is able to (ad)sorb the deliberated $NH_3$ under lean as well as under rich exhaust gas conditions in a broad temperature range.

Any material can be applied as $NH_3$-storing component, which can at least partially adsorb or absorb or adsorb as adduct or can otherwise store $NH_3$. Thereby, Lewis acids or Brönsted acids are preferred.

Within the scope of the present invention, preferably, the $NH_3$-storing component has the function to quantitatively as possible adsorb the $NH_3$, which is generated in the rich phase, however at least to adsorb in a considerable amount. Thereby, the enrichment periods and levels should be as low as possible in order to minimize the additional consumption of fuel.

Within the meaning of the present invention, the enrichment periods and enrichment levels should be high enough in order to allow (i) to empty the $NO_x$-storing catalyst as completely as possible and (ii) to allow an efficient reduction of the nitric oxides, which are deliberated during the moment of the enrichment, to ammonia. Preferred period ratios of lean periods to rich periods are in the range of from 5:1 to 100:1, preferably of from 30:1 to 80:1. Preferred enrichment levels are within a range of $0.8<\lambda<0.99$.

Changing from rich operational mode to the lean operational mode, then the emission of $NO_x$, which is emitted from the engine, is lowered by different ways, namely preferably simultaneously: one portion of the $NO_x$ in turn is stored within the $NO_x$-storing component, whereas the other portion reacts directly with $NH_3$, which is bound in the $NH_3$-storing component. Because now the $NO_x$-lowering occurs simultaneously and in two different reaction paths, according to the invention, all in all a clearly higher $NO_x$ conversion performance can be achieved with respect to the process of the prior art.

The $NH_3$, which is emitted, is bound according to the present invention in a $NH_3$-storing component. During the subsequent lean phase, the $NH_3$ can be degraded together with the $NO_x$, which is emitted from the combustion engine under lean exhaust gas conditions to $N_2$ according to the so-called SCR-reaction. The SCR-reaction takes place in or at a SCR-component. As SCR-component, any material can be applied which is known to the skilled person from SCR-reactions, for example V/Ti-catalysts, as they are known from the stationary exhaust gas treatment. In a preferred embodiment, the SCR-component is a Lewis acid or a Brönsted acid and thereby acts also as $NH_3$-storing component.

According to the present invention, in a preferred embodiment, a combined $NH_3$-storing component/SCR-component is built up chemically in a manner that the stored $NH_3$ is not oxidized or only oxidized in a very low amount with the oxygen, which is contained in the exhaust gas, to $NO_x$ and is emitted.

Because in this way at least one portion of the $NO_x$ which is at first stored in the $NO_x$-storing component is transferred into ammonia and is then reacted in the meaning of the SCR-reaction to $N_2$, the inventive process allows increased $NO_x$ conversion performances, because the SCR-reaction supports the storing of $NO_x$.

In order to allow the simultaneous operation sequence of SCR-reaction and storing of $NO_x$, it is preferred, bringing the $NO_x$-storing component and/or the $NH_3$-storing component and/or the SCR-component, respectively, into contact with each other, preferably in form of a physical mixing. Also, the bringing into contact can be carried out in other ways which are known to the skilled person, for example by chemical and/or mechanical processes or by any combinations of physical, chemical and mechanical processes.

To the contrary, an exclusively or predominantly sequential arrangement of these components is not preferred, because in case of a sequential arrangement, the SCR-reaction and storing of $NO_x$ can be carried out simultaneously towards each other only to a very low extent, however can be carried out rather predominantly one after another. A certain amount of a sequential operation sequence of the reaction, however, does not fall outside the scope of the present invention.

In case that for example the $NO_x$-storing component would be installed upstream to both the $NH_3$-storing component and the SCR-component, then, in lean operational mode, the $NO_x$-storing component would be loaded with $NO_x$, and not until the decreasing storing of $NO_x$ the SCR-reaction could perform a significant contribution to the total $NO_x$ conversion with increasing lean operational mode.

In a preferred embodiment, the $NH_3$-storing component and the SCR-component are identical, that means an appropriate material is able (i) to store $NH_3$ under rich exhaust gas conditions and (ii) to convert under lean exhaust gas conditions according to the SCR-reaction.

In a preferred embodiment, the $NO_x$-storing component contains at least one active metal. This ensures that also CO and HC can be reacted under rich, stoichiometrical and lean exhaust gas conditions effectively to carbon dioxide and water. In the same manner, also the conversion of $NO_x$ to $N_2$ or the $NH_3$ formation under rich and stoichiometrical exhaust gas conditions at an active metal, which is contained within the $NO_x$-storing component, can be carried out successfully.

Alternatively, the catalyst system according to the invention can also contain additives like oxygen-storing materials—for example on the basis of cerium zirconium oxide.

In order to minimize CO and HC breakthroughs during the enrichment phases, in a preferred embodiment another catalyst, for example in form of an oxidation catalyst, can be installed downstream.

The system according to the invention has a higher $NO_x$ conversion performance than previous $NO_x$-storing catalyst systems.

The process and system according to the invention preferably can be applied for the following applications:

The advantages of the invention are in particular revealed, if, for example, the exhaust gas temperatures, for example caused by a sudden load alternation, either fall below or exceed the temperatures, which are necessary or favorable for the storing of $NO_x$. Provided that sufficient $NH_3$ is present within the $NH_3$-storing means, in such cases the SCR-reaction alone can provide a high $NO_x$ conversion to $N_2$.

Other advantages are seen therein that by using the process according to the invention, the engine can be run longer in the lean operational mode and to minimize the secondary emissions.

Another advantage of the process and system according to the invention is that the four components, which are necessary for the exhaust gas system according to the invention, i.e. $NO_x$-storing component, $NH_3$-generating component, $NH_3$-storing component and SCR-component, can be integrated on a common carrier, body or substrate, as for example on a honeycomb body, to a contiguous system. Compared to other processes, which revert back to a continuous feed of ammonia from outside, furthermore, the process according to the invention has the advantage that the precise keeping of a defined stoichiometry, as the case may be actively controlled stoichiometry of $NH_3$ relatively to $NO_x$ is not necessary.

Another object could be achieved with a catalyst for the removal of harmful substances containing nitric oxides ($NO_x$) from the exhaust gases of lean engines in the cyclic lean/rich operational mode, which is characterized in that said catalyst
(i) stores nitric oxides ($NO_x$) in a $NO_x$-storing component,
(ii) converts $NO_x$ to ammonia ($NH_3$),
(iii) stores ammonia in a $NH_3$-storing component,
(iv) reacts $NH_3$ with $NO_x$.

Contrary to the prior art, the storing of nitric oxides, the reduction to ammonia, the storing of ammonia and the ammonia oxidation take place within one catalyst and not in several catalysts. In the new catalyst, the components of the catalyst, which cause said processes, are in a physical contact, whereas the components of the catalysts of the prior art are separated from each other.

The treatment of exhaust gas by using the novel catalyst allows the removal of $NO_x$ with increased efficiency. Surprisingly, said catalyst can also cause a significant lowering of the undesired secondary $NH_3$ emission in comparison to the processes and catalysts of the prior art.

The process for the removal of $NO_x$ from exhaust gases by using the catalyst, which contains the $NO_x$- and $NH_3$-storing components, can also be named as NSR-C-SCR-process ("$NO_x$-storage-reduction coupled with selective-catalytic-reduction").

The term "$NO_x$-storage or $NO_x$-storing or storage or storing of $NO_x$" has the meaning of both $NO_x$ adsorption and $NO_x$ absorption. $NO_x$-adsorption is present, if $NO_x$ is physisorbed or chemisorbed in form of a surface species on the surface of a component, which is present within the catalyst. The term "$NO_x$ adsorption" denominates the formation of a nitrogen-containing "bulk phase" of the $NO_x$-storing means. Accordingly, the analog meaning applies to the storing of $NH_3$ and the $NH_3$-storing component.

In a particular embodiment, the catalyst for the removal of harmful substances containing nitric oxides ($NO_x$) from the exhaust gases of lean engines in the cyclic lean/rich-operational mode is characterized in that the catalyst contains at least one of the materials from the group (1) and at least one acidic solid from the group (2) and optionally at least one of the materials from the groups (3) and (4):

(1) Pt, Pd, Rh, Ir and Ru, each alone or in mixture, being present on a carrier material selected from: oxides, mixed oxides, phosphates and sulfates of Al, Si, Zr, Ti, Ce, the earth alkali metal elements and rare earth elements; heteropoly acids; zeolites; as well as mixtures thereof;
(2) zeolites; heteropoly acids; sulfated zirconium oxide or zirconium phosphates; as well as mixtures thereof;
(3) oxides and mixed oxides of the alkali metal elements, earth alkali metal elements, rare earth elements, zirconium, titanium;
(4) inorganic compounds of V, Cr, Mn, Fe, Co, Ni, Cu, In, Ga, Ag and Sn as well as mixtures thereof;
wherein the catalyst
(i) stores nitric oxides ($NO_x$) in a $NO_x$-storing component,
(ii) converts $NO_x$ to ammonia ($NH_3$),
(iii) stores ammonia in a $NH_3$-storing component,
(iv) reacts $NH_3$ with $NO_x$.

Thereby, the materials from group (1) and optionally (3) and optionally (4) act as $NO_x$-storing component and the acidic solids of group (2) as $NH_3$-storing component. The materials of group (1) and optionally (3) and (4) thereby act also as $NO_x$-adsorption or absorption component, and the acidic solids of group (2) as $NH_3$-adsorption or absorption component.

In another embodiment of the catalyst, one of the carrier materials from group (1) itself is an acidic solid of group (2).

Said further embodiment of the catalyst for the removal of harmful substances containing nitric oxides ($NO_x$) from the exhaust gases of lean engines in the cyclic lean/rich operational mode is characterized in that the catalyst contains at least one of the materials from the group (1) and optionally at least one of the materials from the groups (3) and (4):

(1) Pt, Pd, Rh, Ir and Ru, each alone or in mixture, being present on a carrier material selected from: oxides, mixed oxides, phosphates and sulfates of Al, Si, Zr, Ti, Ce, the earth alkali metal elements and rare earth elements; heteropoly acids; zeolites; as well as mixtures thereof;
(3) oxides and mixed oxides of the alkali metal elements, earth alkali metal elements, rare earth elements, zirconium, titanium;
(4) inorganic compounds of V, Cr, Mn, Fe, Co, Ni, Cu, In, Ga, Ag and Sn as well as mixtures thereof;
wherein at least one of the carrier materials from group (1) is an acidic solid, which has the meaning as defined above for the group (2), and the catalyst
(i) stores nitric oxides ($NO_x$) in a $NO_x$-storing component,
(ii) converts $NO_x$ to ammonia ($NH_3$),
(iii) stores ammonia in a $NH_3$-storing component,
(v) reacts $NH_3$ with $NO_x$.

In another embodiment, also a catalyst can be applied which is characterized in that said catalyst contains at least one of the materials from the group (1) and at least one acidic solid from group (2) and optionally at least one of the materials from group (3) and (4):

(1) Pt, Pd, Rh, Ir and Ru, each alone or in mixture, being present on a carrier material selected from: oxides, mixed oxides, phosphates and sulfates of Al, Si, Zr, Ti, Ce, the earth alkali metal elements and rare earth elements; heteropoly acids; zeolites; as well as mixtures thereof;
(2) zeolites; heteropoly acids; sulfated zirconium oxide or zirconium phosphates; as well as mixtures thereof;
(3) oxides and mixed oxides of the alkali metal elements, earth alkali metal elements, rare earth elements, zirconium, titanium;
(4) inorganic compounds of V, Cr, Mn, Fe, Co, Ni, Cu, In, Ga, Ag and Sn as well as mixtures thereof;

In particular, the efficiency of the catalysts is dependent from the macroscopic design and from the morphology of the catalyst. In particular good results are achieved with catalysts, which are manufactured by the known "washcoat"-processes.

In another embodiment, a catalyst is applied, which is characterized in that said catalyst contains at least one material from the group (1) and at least one acidic solid from the group (2) and optionally at least one of the materials from the groups (3) and (4):
(1) Pt, Pd, Rh, Ir and Ru, each alone or in mixture, being present on a carrier material selected from: oxides, mixed oxides, phosphates and sulfates of Al, Si, Zr, Ti, Ce, the earth alkali metal elements and rare earth elements; heteropoly acids; zeolites; as well as mixtures thereof;
(2) zeolites; heteropoly acids; sulfated zirconium oxide or zirconium phosphates; as well as mixtures thereof;
(3) oxides and mixed oxides of the alkali metal elements, earth alkali metal elements, rare earth elements, zirconium, titanium;
(4) inorganic compounds of V, Cr, Mn, Fe, Co, Ni, Cu, In, Ga, Ag and Sn as well as mixtures thereof;
wherein the catalyst can be produced according to a washcoat process.

The active metals of group (1) act as active metals, therefore are predominantly responsible for the catalytic activity. The term active metal is to be understood not only for the respective element but also for possible oxides and suboxides of said noble metals.

The heteropoly acids of group (1) respectively (2) have the meaning of inorganic polyacids, which have two kinds of central atoms. They can be formed by acidifying polybasic metal oxygen acids, as for example those of chromium, molybdenum, tungsten and vanadium and element cations, as for example those of $Ti^{4+}$, $Zr^{4+}$, $Al^{3+}$, $Co^{2+}$ or $Co^{3+}$, $Cu^{1+}$ or $Cu^{2+}$ and other or non-metal oxygen acids.

As ammonia-storing component of the group (2), acidic solids are suited, which are formed from the group of the zeolites, the heteropoly acids, the sulfated zirconium oxides and the zirconium phosphates.

Zeolites are solids, which have different acidic strength, because, for example, ion-exchanged zeolites often have a lower solid state acidity. When having a high amount of aluminum, then, the acidity of zeolites can be very low. Furthermore, it is possible to minimize the acidity of zeolites by means of thermal or chemical treatments, so that said zeolites do not show typical properties of solids with high acidity.

When applying zeolites as carrier oxides for the active components (that is the noble metal component), therefore, the ability of the respectively applied zeolite to be able to act simultaneously as ammonia-storing component, is dependent from the acidic properties of the zeolite itself.

In one of the embodiments, the zeolite or the zeolites and the heteropoly acids of group (1) are identical with the zeolite or the zeolites and the heteropoly acids of group (2).

In said embodiment, the $NO_x$-storing component has at the same time also the function of the $NH_3$-storing component.

As acidic solid of the group (2), preferably a zeolite or zeolites, which have a Si/Al ratio of more than 3 are applied. The Si/Al ratio of the acidic zeolites should be at least 3, because with such zeolites a sufficient hydrothermal stability of the zeolite is ensured.

Preferred zeolites of the group (2) are selected from the group pentasiles, Y-zeolite, USY, DAY, mordenite and zeolite-β.

Said zeolites can be applied either in the pure form or as mixtures, wherein also a use of forms of doped zeolites is comprised, which are obtained by means of ion-exchange or by any other treatment. Thereby, the zeolite can be present in the sodium form, ammonium form or in the H form. Furthermore, it is possible to transfer the sodium, ammonium or H form into another ionic form by impregnation with metal salts and oxides or by means of ion-exchange. An example is the transfer of Na—Y-zeolite into SE-zeolite (SE=rare earth element) by ion-exchange in aqueous rare earth element chloride solution. In particular preferred is an ion-exchange with the earth alkali metal elements, rare earth elements, gallium, indium and iron. The respective elements can be present on or in the zeolite as ions, oxides, suboxides or carbonates.

The acidic zeolites can act both as $NH_3$-storing component and as SCR-catalysts.

As the case may be, the catalyst can contain besides the $NO_x$-storing component and the $NH_3$-storing component a third component. Said component consists at least of an ion-exchanged zeolite. Said component acts as additional $NH_3$-SCR-component. Thereby, the use of ion-exchanged and/or rare earth element-exchanged zeolites is preferred.

The materials of the group (4) serve as dopants. In general, they are present as inorganic compound or in elementary form. Preferably, they are present in oxidic form.

The term oxide also includes all suboxides, hydroxides and carbonates.

In the catalyst, the amount of the sum of the noble metals in the total amount of the catalyst is in the range of from 0.05 to 10 weight-%, wherein the amount of the noble metals in the total mass of the catalyst is in the range of from 0.1 to 5 weight-%.

The catalyst is also characterized in, that the amount of acidic solid from group (2) in the total mass of catalyst is in the range of from 5 to 95 weight-%, wherein a range of from 10 to 75 weight-% is preferred.

In another embodiment, the catalyst contains from group (1) palladium on zirconium oxide or cerium oxide or aluminum oxide or silica alumina mixed oxide as carrier oxide.

In a particular embodiment of the preceding embodiment, the catalyst contains additionally to Pd Ru or Rh or Pt.

In another embodiment, the catalyst contains additionally from group (2) cerium oxide or from group (2) cerium oxide and from group (3) iron or from group (2) cerium oxide and praseodymium oxide and from group (3) iron.

In another embodiment, the catalyst is present on a monolithic honeycomb body.

The novel catalyst can be manufactured according to a process, which comprises the step (i):
(i) Bringing the $NO_x$-storing component with the $NH_3$-storing component of the catalyst into contact or bringing at least one of the materials of the group (1) with at least one acidic solid of group (2) and optionally at least one of the materials from groups (3) and (4) into contact.

Dependent on the embodiment of the catalyst, the bringing into contact can be carried out in a pure mechanical manner by mixing of the solid materials of the groups (1) and optionally (3) and/or (4) with the materials of group (2) or by means of a washcoat process.

For the macroscopic design and the morphology of the catalyst, which can have a high influence on the efficiency, therefore, all embodiments are preferred, which, in general, have already proved of value in the catalyst production. In particular, said embodiments are the known "washcoat" and/or "honeycomb" technologies.

The last mentioned technologies are based upon that the predominant amount of the carrier material is ground in aqueous suspension to particle sizes of several micrometers and is than applied on a ceramic or metallic shaped body. Basically, other components in water-soluble or water-insoluble form can be applied into the washcoat before or after the coating. After applying of all ingredients of the catalyst onto the shaped body, as a rule, said body is dried and, as the case may be, calcinated at increased temperatures.

Particularly preferred are arrangements of the catalyst material with high BET-surface and high retention of the BET-surface after thermal aging. With respect to the structure of the pores, in particular preferred are macro pores, which are formed as ducts, which coexist together with meso pores and/or micro pores. Thereby, the meso pores and/or the micro pores contain the active metal. Furthermore, it is particularly preferred, that the acidic solid of group (2), which has to serve as $NH_3$-storing function and as the SCR-function, is mixed as thoroughly as possible with the one or the more $NO_x$-storing components.

The catalyst, which is used for the process preferably exists as powder, granulate, extrudate, shaped body or as coated honeycomb body.

The integration of the catalytic components onto a common substrate, preferably in form of a monolithic honeycomb body, is preferably carried out in a manner that the before-mentioned components of the catalysts are applied onto a common substrate by means of bringing the components into contact by means of the known washcoat processes.

However, it is also possible, to mix the components, that is the $NO_x$- and the $NH_3$-storing component, mechanically, and then to apply the mixture, for example in form of mixed powders, granulates, extrudates or shaped bodies.

Despite the high complexity of the catalyst, it is therefore possible, to incorporate all the components, which are necessary for the design of the catalyst, onto a common substrate. So, an efficient and cost-saving exhaust gas treatment system can be provided.

Another object of the invention is also a catalyst system, in which the before-described catalyst is present in combination with at least one further catalyst.

In one embodiment, at least one further catalyst is a $NO_x$-storing catalyst. The $NO_x$-storing catalysts can be applied which are described in the prior art.

In the catalyst system, the novel catalyst and the $NO_x$-storing catalyst are preferably arranged sequentially.

In another embodiment, the catalyst is present in mixture with the $NO_x$-storing catalyst within the catalyst system.

In another embodiment, an oxidation catalyst is installed downstream to the catalyst or the catalyst system or a $NO_x$-sensor is installed downstream to the at least one further catalyst.

Another object of the invention is the use of the new catalyst or of a catalyst system, which contains the catalyst, for the removal of harmful substances containing nitric oxides ($NO_x$) from exhaust gases of lean engines, that is a combustion engine, in the cyclic lean-rich operational mode.

Another object of the invention relates to a process for the removal of harmful substances including nitric oxides ($NO_x$) from the exhaust gases of lean engines in the cyclic lean-rich operational mode characterized in that a catalyst or a catalyst system is used as described above.

In a particular embodiment, said process is characterized in that a catalyst or a catalyst system is used as described above, whereby the process comprises the steps (i) to (iv):
(i) storing of $NO_x$ in a $NO_x$-storing component,
(ii) conversion of the stored $NO_x$ to ammonia $NH_3$,
(iii) storing of ammonia in a $NH_3$-storing component,
(iv) reaction of $NH_3$ with $NO_x$.

The process for the purification of the exhaust gas is also characterized in that step (i) runs under lean exhaust gas conditions and the step (ii) under rich exhaust gas conditions and that the steps (iii) and (iv) run both under rich and lean exhaust gas conditions.

Furthermore, steps (i) and (iv) can run at least temporarily simultaneously and/or parallelly.

The term combustion engine has the meaning of thermal energy converter, which convert chemical energy, which is stored in fuels, by combustion into heat and into mechanical energy. For engines with internal combustion, the air, which is enclosed in a gas-proof and changeable working space (for example a plunger), is the working medium, which is defined in the meaning of a thermal engine, and at the same time the carrier for the oxygen, which is necessary for the combustion. The combustion takes place in a cyclic manner, whereby both the fuel and the (air)oxygen are freshly loaded before each cycle. In dependence from the guiding of the cycle, for example described by a pV-working diagram according to Carnot, it can be differentiated thermodynamically exactly between an Otto engine and a Diesel engine. A practical working definition of each of said engine types is given below.

For the air number, which is used for the classification of the engine types as well as for the classification of the particular catalysts, the above mentioned applies. For the disclosed particular catalyst types, mixtures in particular with $\lambda>1.2$ are denominated as "lean" and such with $\lambda<1.0$ as "rich", in order to obtain a clear limitation from the stoichiometrical range. Accordingly, the so defined rich and/or lean mixtures are also denominated as non-stoichiometrical mixtures within the meaning of the invention.

Conventional Otto engines are characterized by the formation of a homogeneous petrol air mixture outside of the working space, i.e. is outside of the plunger space, in which the combustion takes place, as well as by controlled externally-supplied ignition. Otto engines need low-boiling fuels and fuels which do not easily ignite (the ignition limits of an Otto engine are typically between $\lambda=0.6$ and $\lambda=1.4$). Within the context of the present invention, it is of particular importance with respect to the exhaust gas catalysis that conventional Otto engines, which have a three-way catalytic converter, which is controlled by means of a $\lambda$-sensor, are run predominantly at a $\lambda$ value of approximately one (=stoichiometrical operation).

The term "lean engines" encompasses such Otto engines, which are predominantly run with oxygen excess. For the purpose of the present invention, lean engines are concretely defined by means of their $\lambda$ value, that is lean engines within the meaning of the present invention are engines, which are also run outside of fuel cut-offs in the overrun, at least partially in the lean condition, that is at a $\lambda$ value of 1.2 or more. Besides, in case of lean engines, naturally also rich operational modes and stoichiometrical operational modes can occur: a short-termed enrichment of the engine and therewith also of the exhaust gases can be initiated by means of modern injection systems by the engine electronic or can occur also in the natural drive operation (for example in case of load increasement, at full load or when starting). An alternating operational mode of rich and lean cycles is denominated as "rich-lean operational mode" within the meaning of the present invention.

In particular, the term lean engines in the meaning of the invention in general encompasses the following embodiments:
all Otto engines with direct injection (BDE-engines) and with operation conditions of $\lambda>1$, as well as all Otto engines with external preparation of the fuel mixture. Inter alia, said class encompasses all other stratified-charge engines, that are engines, which have near the ignition plug a mixture, which can be ignited readily, which, however, all in all have a lean mixture, as well as Otto engines with higher compression in connection with direct injection. Hereunder, for example, engines are encompassed according to the Mitsubishi process (GDI=gasoline direct injection; common rail injection), the FSI (=fuel stratified injection)-engine, which is developed by VW, or the IDE (=injection direct essence)-engine, which is conceived by Renault.

all Diesel engines (see below);

multi-substance engines, that are engines which combust fuels, fuel mixtures like alcohols, bio alcohols, vegetable oils, kerosene, petrol as well as any mixtures of two or more of the before-mentioned substances, which ignite easily or not easily.

Diesel engines are characterized by internal mixture formation, a heterogeneous fuel-air mixture as well as by self-ignition. Accordingly, Diesel engines require fuels which ignite readily. Within the context of the present invention, it is of particular meaning that Diesel exhaust gases show similar characteristics like the exhaust gases of lean engines, that means that they are continuously lean, that is oxygen-rich. Consequently, with respect to the nitric oxide removal, similar demands have to be made with respect to the catalysts for the $NO_x$-removal in connection with Diesel engines which are employed for Otto engines in the lean operational mode. An essential difference of Diesel passenger car engines in comparison to Otto passenger car engines however, is the general lower exhaust gas temperature of Diesel passenger car engines (100° C. to 350° C.) in comparison to Otto passenger car engines (250° C. to 650° C.), which occur within the scope of the driving cycles, which are regulated by law. A lower exhaust gas temperature renders the use of catalysts, which are not or only little contaminated with sulfates, in particular attractive, because the desulfatization, as mentioned above, is effectively possible above exhaust gas temperatures of approximately 600° C. All what is said in the present invention with respect to catalysts for lean engines applies respectively also for catalysts, which are used for Diesel engines.

In dependence from the mixture formation and the engine characteristics load-rotation speed, the consequence results, that for different engines specifically adjusted catalysts are necessary for the exhaust gas treatment. So, for example, a catalyst for a conventional Otto engine, the fuel air mixture of which is adjusted continuously to $\lambda \approx 1$ by means of injection and throttle valve, and whose air number is optionally controlled by means of a $\lambda$-sensor, has completely different functionalities for reducing $NO_x$ than, for example, a catalyst for a lean engine, which is run at $\lambda > 1.2$, i.e. which has in the normal drive operation an oxygen excess. It is obvious that in case of oxygen excess, a catalytically reducing of $NO_x$ at an active metal is made difficult.

The term "Diesel oxidation catalyst" in general relates to catalysts, which remove in the exhaust gas of combustion engines two important harmful substances, that is carbon monoxide by oxidation to carbon dioxide as well as hydrocarbons by oxidation to, in the ideal case, water and carbon dioxide. When using a catalyst in Diesel engines, then, a third function can be added to the two mentioned functions, namely the removal of carbon black by oxidation.

The term "three-way catalytic converter" in general relates to catalysts, which remove in the exhaust gas of combustion engines three essential harmful substances, that is nitric oxides ($NO_x$) by reduction to nitrogen, carbon monoxide by oxidation to carbon dioxide as well as hydrocarbons by oxidation to, in the ideal case, water and carbon dioxide. When using a catalyst in Diesel engines, then, a fourth function can be added to the three mentioned functions, that is the removal of carbon black by oxidation.

Conventional three-way catalytic converters for Otto engines according to the prior art, are used in the stoichiometrical operation, that is at $\lambda$-values, which are in a narrow range around 1.0. Thereby, the $\lambda$-value is adjusted by regulation of the petrol air mixture within the combustion space by means of injection and throttle valve. In the non-stoichiometrical operation, that is in the non-conventional operation, $\lambda$-values are possible, which clearly are different from 1.0, for example $\lambda > 1.2$ or $\lambda > 2.0$, however also $\lambda < 0.9$. The discontinuous operation of an engine, that is the alternating operation between lean and rich operational mode of the engine, is denominated as rich-lean operational mode.

In the following, the technical advantages of the processes are further illustrated and are discussed in comparison to the known processes and catalysts.

It is already known from the prior art that the active metals Pt, Pd, Rh, Ir and Ru have several functions in the purification of the exhaust gas of lean engines. On one hand, they themselves can serve as $NO_x$-adsorbents and can store $NO_x$ in the lean phase. On the other hand, they support the storage of $NO_x$ within the $NO_x$-storing components. For example, Pt catalyses the oxidation of NO to $NO_2$, which is absorbed or adsorbed in a subsequent step as nitrate or nitrite on or in a $NO_x$-storing material.

Furthermore, the active metals catalyze the reduction of the stored $NO_x$ to $NH_3$ within the enrichment phase. Thereby, the ammonia is not exclusively formed from the nitric oxides, which are stored within the $NO_x$-storing catalyst, however, additionally in inferior amounts from those nitric oxides, which are emitted during the enrichment phases respectively which are emitted during the operational mode which is below stoichiometry (that is the rich operational mode) from the engine.

Additionally, the noble metals also support the oxidation of CO and HC during the lean phases as well as all three-way functionalities during the stoichiometrical engine operational mode.

The formed ammonia is stored in the $NH_3$-storing component of the catalyst. Said component is able to sorb the deliberated $NH_3$ both under lean and under rich exhaust gas conditions within a broad temperature range. This means that the $NH_3$-storing component serves for sorbing the $NH_3$, which is generated during the rich phase, as quantitatively as possible. As already discussed above, the enrichment periods and levels should be as low as possible in order to minimize the fuel extra consumption. On the other hand, within the meaning of the present invention, enrichment periods and levels should be high enough in order to empty the $NO_x$-storing catalyst as completely as possible and in order to ensure an efficient reduction of the nitric oxide, which are deliberated in the moment of the enrichment, to ammonia.

If the rich operational mode is switched to the lean operational mode, then, it is conceivable that the emission of $NO_x$, which is emitted by the engine, can be lowered simultaneously in two different ways: one portion of the $NO_x$ is stored within the $NO_x$-storing catalyst, whereas the other portion reacts directly with $NH_3$, which is bound within the $NH_3$-storing means, to $N_2$. Since now the $NO_x$ lowering occurs simultaneously and in two different reaction ways, all in all a significant higher $NO_x$ conversion performance can be achieved as compared to the known processes when using known $NO_x$-storing catalysts.

According to the present process, the emitted $NH_3$ is bound in a $NH_3$-storing component. During the subsequent lean phase, then, the $NH_3$ can be degraded according to the so-called SCR-reaction (selective catalytic reduction) with the $NO_x$, which is emitted from the combustion engine, under lean exhaust gas conditions.

The $NH_3$-storing/SCR-catalyst, which is combined for the process, is chemically formed in a way that the stored $NH_3$ in the case of lean operation is not oxidized or only to a very small extent oxidized with the oxygen which is contained in the exhaust gas, back to $NO_x$ and is emitted. Because in this manner, at least one portion of the $NO_x$ which at first is stored in the $NO_x$-storing catalyst, is converted to ammonia and is then reacted in the meaning of the SCR-reaction to $N_2$, the process allows an increased $NO_x$ conversion performance, because the SCR-reaction supports the storage of $NO_x$.

In order to ensure the simultaneous course of the SCR-reaction and $NO_x$-storage, it is desirable not only from an economic aspect to integrate the $NO_x$-storing catalyst, the $NH_3$-storing means and the SCR-catalyst into each other, for example in form of a physical mixture. In contrast, a sequential arrangement of said components would not be target-oriented, because in case of a sequential arrangement, the SCR-reaction and storing of $NO_x$ could take place simultaneously only to a very low extent, however rather widely consecutively. If, for example, the $NO_x$-storing catalyst would be installed upstream of both the $NH_3$-storing component and the SCR-catalyst, then, in lean operational mode, at first the $NO_x$-storing catalyst would be filled with $NO_x$. Only in case of the decrease of the $NO_x$-storage during the increasing lean operational mode, the SCR-reaction could perform a significant amount to the total $NO_x$ conversion.

In one embodiment of the process, said process is run in manner that a $NO_x$ sensor is installed downstream of the catalyst or the catalyst system, the measured values of which are transferred to an engine management system of the combustion engine, which performs the rich-lean adjustments of the exhaust gas. In a preferred embodiment, an enrichment is induced, when exceeding an adjustable $NO_x$ threshold value.

When using the above-defined catalysts, the process has in particular in the low temperature range a higher $NO_x$ conversion performance than previous processes with known $NO_x$-storing catalysts.

Particularly revealed are the advantages of the invention, if, for example, the exhaust gas temperatures fall under or exceed the temperatures, which are necessary for the $NO_x$-storage, for example caused by sudden load alternation. Provided that sufficient $NH_3$ is present within the $NH_3$-storing component, in such cases the SCR-reaction alone can ensure a high $NO_x$ conversion to $N_2$. Another advantage is to be able to drive the engine longer in the lean operational mode and therefore to minimize secondary emissions.

The process for the removal of harmful substances can be run in a manner that the catalyst can be employed also in combination with a conventional catalyst, for example a $NO_x$-storing catalyst from the prior art. It was found that such a combination additionally has, with respect to the high conversion performance in the low temperature range, also a high conversion performance in the high temperature range. Obviously, this combination has a synergistic effect, which was not to be expected.

In order to minimize CO and HC breakthroughs during the enrichment phases, another catalyst can be installed downstream of the catalyst, preferably in form of an oxidation catalyst.

For the process of the removal of harmful substances, the catalyst preferably is mounted in a position close to the engine or in the underbody position of a motor vehicle.

The catalyst of the process can be run also in combination with at least one further catalyst or filter selected from the following group: conventional starting catalysts respectively light-off catalysts, HC-SCR-catalysts, carbon black or carbon black particle filters.

Thereby, the carbon black particle filter can be coated with the catalyst, which is used for the process.

The figures relate to the embodiments which are subsequently described.

EXAMPLES FOR CARRYING OUT THE PROCESS

In the following, in exemplified embodiments, the process for the treatment of exhaust gases and the manufacture of exemplified catalysts according to the invention are illustrated as well as the improved properties compared with the processes and catalysts known from the prior art. The fact that concrete examples and concrete number values are used, has to be understood not to be as limitation of the general indications, which are made in the description and in the claims.

Measurements, which relate to the process according to the invention using the system according to the invention were carried out in packed bed laboratory reactors made from stainless steel in an simulated exhaust gas from an engine. The system was tested in the cyclic rich/lean operational mode (5 s rich/60 s lean).

The experimental parameters were the following:

| temperature range: | 150-450° C. |
|---|---|
| composition of the gas mixture | |
| lean: | 1000 vppm CO, 100 vppm propen, 300 vppm NO, 10% $O_2$, balance - $N_2$. |
| rich: | 0.03% $O_2$, ~6% CO, ~2% $H_2$ |
| gas flow rate: | 45.000 $h^{-1}$ |

The measurement of $O_2$ was carried out with a Lambda-Meter of the company Etas. $NO_x$ was measured with a chemi-luminescence device of the company Ecophysics. The measurement of $NH_3$ was carried out with a mass spectrometer of the company Balzers.

Figure 1:
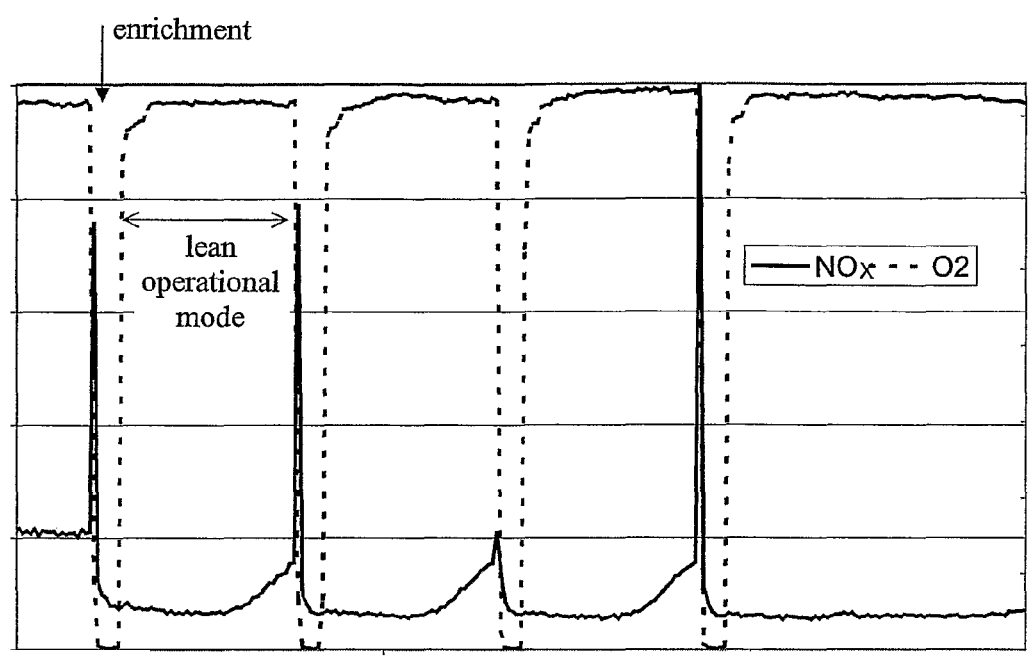
FIG. 1 shows the amount of $NO_x$ (vertical axis, arbitrary units) in an exhaust gas of an engine in dependence from the time (horizontal axis) using a conventional storage (storing) catalyst at 250° C. (5 s rich/60 s lean)
Figure 2:
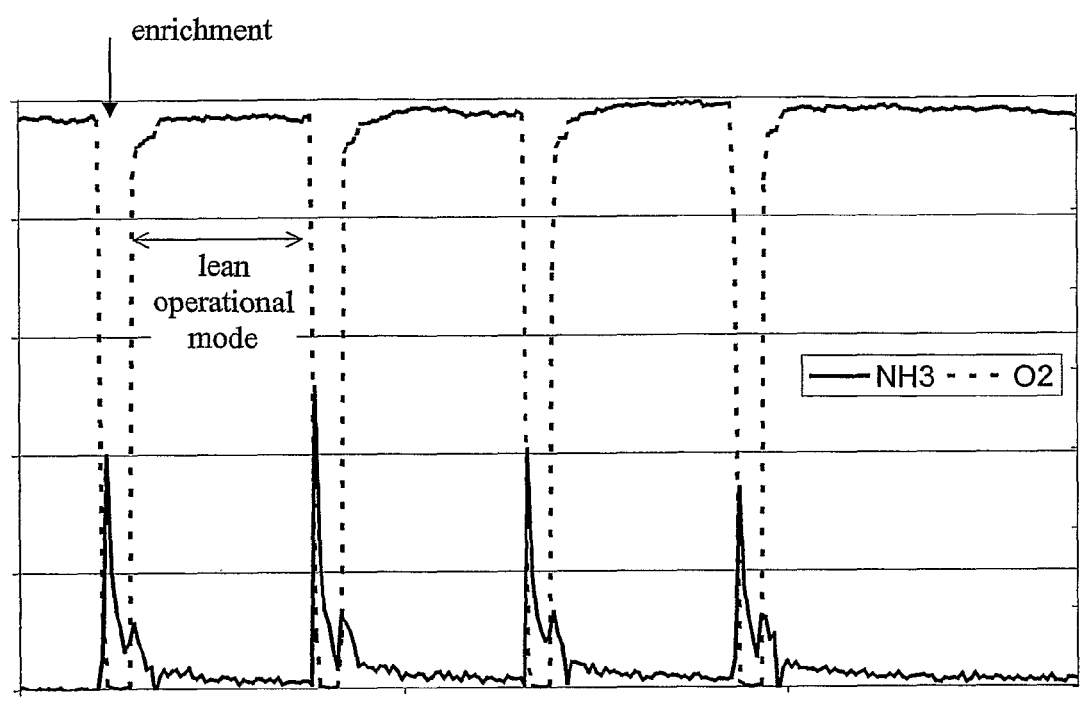
FIG. 2 shows the amount of $NH_3$ (vertical axis, arbitrary units) in an exhaust gas of an engine in dependence from the time (horizontal axis) using a conventional storage catalyst at 250° C. (5 s rich/60 s lean)
Figure 3:
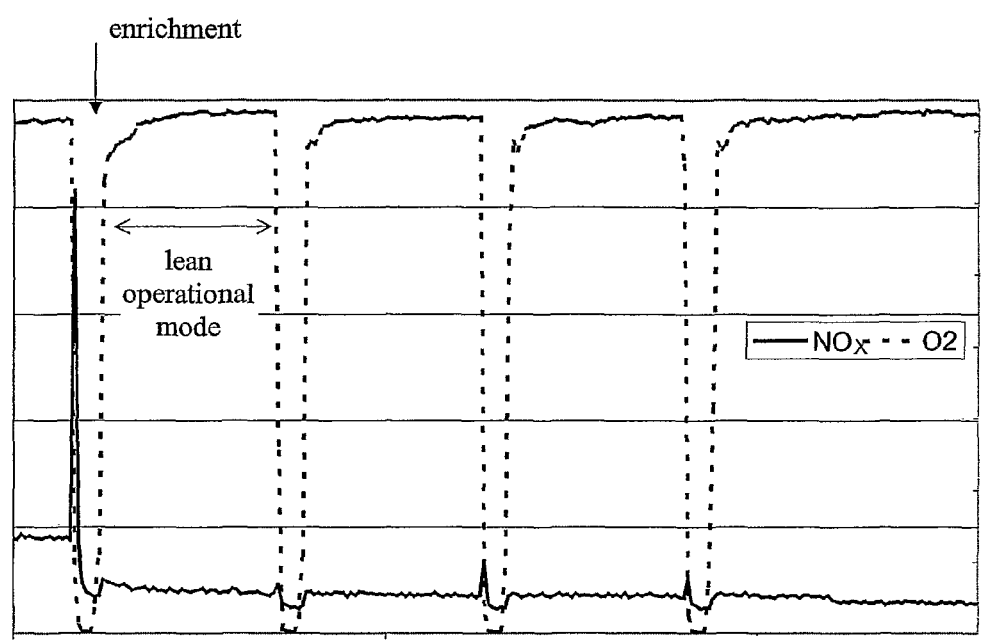
FIG. 3 shows the amount of $NO_x$ (vertical axis, arbitrary units) in an exhaust gas of an engine in dependence from the time (horizontal axis) when carrying out the process according to the invention and using the integrated system at 250° C. (5 s rich/60 s lean)
Figure 4:
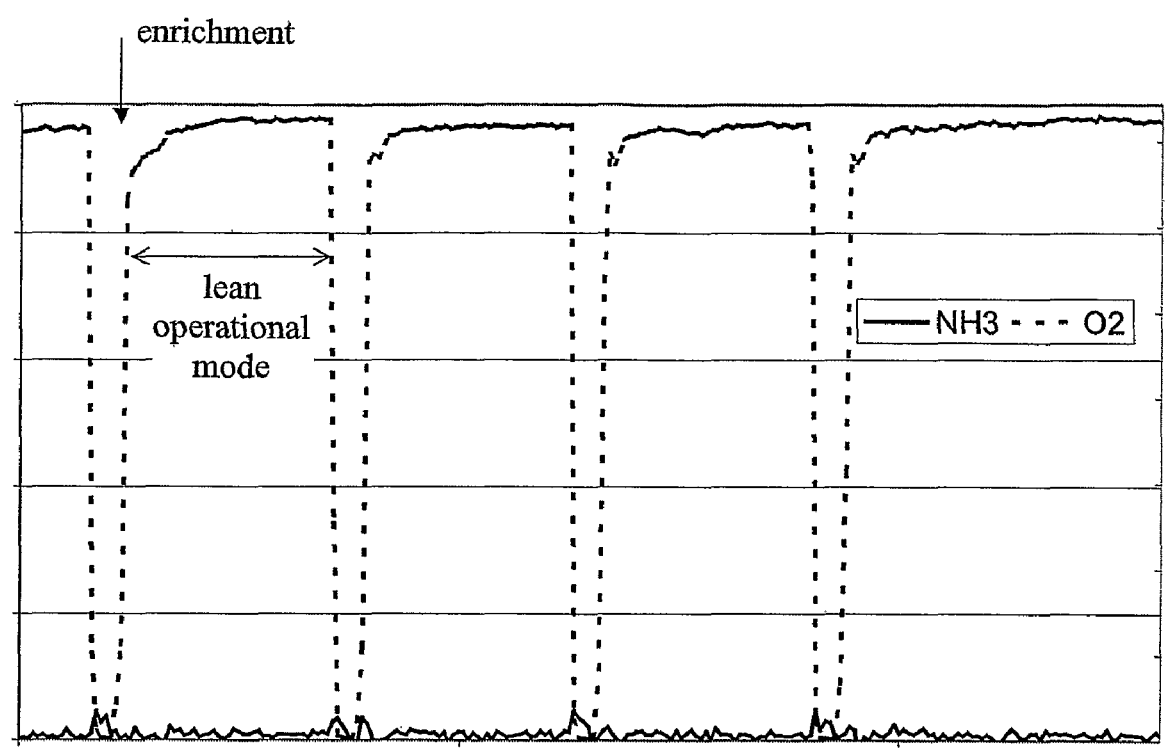
FIG. 4 shows the amount of $NH_3$ (vertical axis, arbitrary units) in an exhaust gas of an engine in dependence from the time (horizontal axis) when carrying out the process according to the invention and using the integrated system according to the invention at 250° C. (5 s rich/60 s lean)

The measurements, which are shown in FIGS. 1 to 4, allow a comparison of a conventional process using a conventional $NO_x$-storing catalyst (FIGS. 1 and 2) with the process according to the invention using the exhaust gas treatment system according to the invention, consisting of $NO_x$-storing component, $NH_3$-generating component, $NH_3$-storing component and SCR-component (FIGS. 3 and 4). In case of said embodiment, the four mentioned components were incorporated together on a single honeycomb carrier. For comparison between the conventional reference system and the system according to the invention, the masses of applied $NO_x$-storing component and active metal were identical, respectively. The system according to the invention contained additionally to the $NO_x$-storing component another component, which had both the function of a $NH_3$-storing component and a SCR-catalyst.

FIG. 1 shows the concentration of $NO_x$ (vertical axis, arbitrary units) in an exhaust gas of an engine in dependence from the time (horizontal axis) using a conventional storage catalyst at 250° C. (5 s rich/60 s lean). Accordingly, FIG. 2 shows the concentration of $NH_3$ (vertical axis, arbitrary units) in an exhaust gas of an engine in dependence from the time (horizontal axis) using the same conventional storage catalyst at 250° C. (5 s rich/60 s lean).

FIG. 3 shows the concentration of $NO_x$ (vertical axis, arbitrary units) in an exhaust gas of an engine in dependence from the time (horizontal axis) when carrying out the process according to the invention at 250° C. (5 s rich/60 s lean). Accordingly, FIG. 4 shows the concentration of $NH_3$ (vertical axis, arbitrary units) in an exhaust gas of an engine in dependence from the time (horizontal axis) when carrying out the process according to the invention at 250° C. (5 s rich/60 s lean).

The measurements show clearly that (i) the system for the treatment of the exhaust gas according to the invention has no (significant) $NH_3$ emissions during the enrichment phases compared to a conventional $NO_x$-storing catalyst and additionally (ii) ensures a (practically) complete removal of $NO_x$ over the total operation time of the lean phase. The conventional $NO_x$-storing catalyst, however, loses significant efficiency with increasing time of the lean operational mode.

EXAMPLES FOR CATALYSTS

Example 1

B01

The catalyst consists of two components I and II.

For the manufacture of the component I (KI), a zirconium oxide (XZ16075, Company Norton) was suspended in water and was ground in a ball mill. After the drying, 1.25 g of the ground material were provided as carrier oxide.

147 µl of an aqueous 1.6 molar palladium nitrate solution were mixed with 178 µl 2.5 molar cerium nitrate solution and diluted with 675 µl water. The carrier oxide was impregnated with 1000 µl of the resulting solution, which corresponded to the water absorption of the zirconium oxide. The so impregnated carrier oxide was then dried for 16 hours at 80° C.

The resulting loading was two weight-% palladium and 5 weight-% cerium related to the amount of carrier oxide.

As component II, a beta-zeolite (H-BEA-25, Company Süd Chemie) was applied.

For the manufacture of a catalyst, 1.25 g of component I, 0.53 g of the component II and 3 ml water were mixed in a mortar. Then, the resulting material was dried for 16 hours at 80° C.

Subsequently, the material was calcinated for 2 hours at 500° C. in air (indicated as "fresh").

One portion of the fresh material was additionally calcinated for 16 hours at 650° C. in an air flow, which contained 10% water (indicated as "aged").

Examples 2 to 45

B02-B45

The catalysts were prepared in analogy to Example 1, wherein for the manufacture of component I (KI) the zirconium oxide was impregnated with an aqueous solution of one or more salts, like palladium nitrate, trinitratonitrosylruthenium(II), rhodium nitrate, platinum nitrate, iron nitrate, praseodymium nitrate, cerium nitrate, potassium nitrate, and wherein component II was varied.

The table with the examples (Table 1) shows the composition of the respective catalysts based on weight-percent.

Example 46

B46

The catalyst consists of two components I and II.

For the manufacture of component I (KI), cerium(III) nitrate (Company Aldrich) was calcinated for two hours at 500° C. After the calcination, 1 g of the material was provided as carrier oxide.

118 μl of an aqueous 1.6 molar palladium nitrate solution were diluted with 982 μl water. The carrier oxide was impregnated with 1100 μl of the resulting solution, which corresponded to the water absorption of the carrier material. Then, the so impregnated carrier oxide was dried at 80° C. for 16 hours.

The resulting loading related to the amount of carrier oxide was 2 weight-% palladium.

As component II, a beta-zeolite (H-BEA-25, Company Süd Chemie) was applied.

For the manufacture of a catalyst, 1 g of component I, 1 g of the component II and 3 ml water were mixed in a mortar. The resulting material was dried at 80° C. for 16 hours.

Subsequently, the material was calcinated for 2 hours at 500° C. in air (indicated as "fresh").

One portion of the fresh material was additionally calcinated at 650° C. for 16 hours in an air stream, which contained 10% water vapor (indicated as "aged").

Examples 47 to 75

B47-B75

The catalysts were manufactured in analogy to Example 46, wherein for the manufacture of component I (KI) the carrier oxide was impregnated with an aqueous solution of one or more salts, like palladium nitrate, trinitratonitrosylruthenium(II), rhodium nitrate, platinum nitrate, iron nitrate, praseodymium nitrate, cerium nitrate, and wherein the component II was varied.

Example 76

The catalyst consists of two components I and II.

For the manufacture of component I (KI), silica-alumina (Siralox 5/170, Company Sasol) was suspended in water and was ground in a ball mill. After drying, 5 g of the ground material was provided as carrier oxide.

513 μl of an aqueous, 1.0 molar platinum nitrate solution were mixed with 15600 μl of an aqueous, 0.35 molar barium nitrate solution and was diluted with 387 μl water. The carrier oxide was mixed with 16500 μl of said solution, and the water was evaporated upon stirring. The so impregnated carrier oxide was dried at 80° C. for 16 hours in a drying oven. Subsequently, component II was calcinated for two hours at 500° C. under air in a muffle furnace.

The resulting loading related to the amount of carrier oxide was 2 weight-% platinum and 15 weight-% barium.

As component II, a beta-zeolite (Zeocat PB/H, Company Zeochem) was applied.

For the manufacture of a catalyst, 0.25 g of component I were mixed with 0.25 g of component II.

Example 77

The catalyst consists of two components I and II.

For the manufacture of component I (KI), silica-alumina (siralox 5/170, Company Sasol) was suspended in water and was ground in a ball mill. After the drying, 5 g of the ground material was provided as carrier oxide.

384 μl of an aqueous, 1.0 molar platinum nitrate solution were mixed with 243 μl of an aqueous 1.0 molar rhodium nitrate solution and 54610 μl of an aqueous, 0.1 molar barium nitrate solution. The carrier oxide was mixed with 55237 μl of said solution and the water was evaporated upon stirring. The so impregnated carrier oxide was then dried for 16 hours at 80° C. in a drying oven. Subsequently, component I was calcinated at 500° C. under air in a muffle furnace.

The resulting loading related to the amount of carrier oxide was 1.5 weight-% platinum, 0.5 weight-% rhodium and 15 weight-% barium.

As component II, a beta-zeolite (Zeocat PB/H, Company Zeochem) was applied.

For the manufacture of a catalyst, 0.25 g of component I were mixed mechanically with 0.25 g of component II.

Example 78

The catalyst consists of three components.

For the manufacture of component I (KI), a zirconium oxide (XZ16075, Company Norton) was suspended in water and was ground in a ball mill. After the drying, 5 g of the ground material was provided as carrier oxide.

752 μl of an aqueous, 1.0 molar platinum nitrate solution were mixed with 198 μl of an aqueous 1.0 molar trinitratonitrosylruthenium(II) solution, 714 μl of an aqueous 2.5 molar cerium nitrate solution and were diluted with 2336 μl water. The carrier oxide was impregnated with 4000 μl of the resulting solution, which related to the water absorption of the zirconium oxide. The so impregnated carrier oxide was then dried at 80° C. for 16 hours.

The resulting loading related to the amount of carrier oxide was 1.6 weight-% palladium, 0.4 weight-% ruthenium and 5 weight-% cerium.

Component II was a beta-zeolite (H-BEA25, Company Süd Chemie).

For the manufacture of component III (KIII), 0.5 g $NH_4$ beta-zeolite ($NH_4$-BEA25, Company Süd Chemie) were fed to a 1 molar cerium nitrate solution, and were stirred for 2 hours at 80° C. Afterwards, the zeolite material was filtrated, was washed with completely desalted water and was dried for 16 hours at 120° C. The resulting material was calcinated for two hours at 500° C. in air in an muffle furnace.

For the manufacture of a catalyst, 1.25 g of component I, 0.75 g of component II, 0.5 g of component III and 5 ml water were mixed in a mortar. The resulting material was then dried for 16 hours at 80° C.

Subsequently, the material was calcinated for 2 hours at 500° C. in air (indicated as "fresh").

One portion of the fresh material was additionally calcinated for 16 hours at 650° C. in an air stream, which contained 10% water (indicated as "aged").

Example 79

B79

The catalyst consists of a mechanical mixture of two catalysts.

For the manufacture of the catalyst (indicated as "fresh"), 0.18 g of the catalyst according to Example 1 (B01) were mixed with 0.15 g of the reference catalyst (VB01).

Example 80

B80

The catalyst consisted of a mechanical mixture of two catalysts. For the manufacture of the catalyst (indicated as "fresh"), 0.18 g of the aged catalyst from Example 34 (B34) were mixed with 0.15 g of the reference catalyst (VB01).

Example 81

B81

The catalyst consists of a mechanical mixture of two catalysts.

For the manufacture of the catalyst (indicated as "fresh"), 0.18 g of the aged catalyst from Example 35 (B35) were mixed with 0.15 g of the reference catalyst (VB01).

Comparison Example 01

VB01

Comparison Example 01 contains an $NO_x$-storing catalyst based on Pt/Pd/Rh/Ba/Ce (reference catalyst) as known from the prior art.

Comparison Example 02

VB02

Comparison Example 02 includes the component I (KI) of the catalyst according to Example 2 (B02), which was calcinated for two hours at 500° C.

The loading related to the amount of zirconium oxide was 2 weight-% palladium, 0.4 weight-% ruthenium and 5 weight-% cerium.

Comparison Example 03

VB03

Comparison Example 03 includes the component I (KI) of the catalyst according to Example 6 (B06), which was calcinated for two hours at 500° C.

The loading related to the amount of zirconium oxide was 2 weight-% palladium, 0.4 weight-% ruthenium, 2 weight-% iron and 5 weight-% cerium.

In the table with the examples (Table 1), the compositions of the respective catalysts are shown on basis of weight-percent.

TABLE 1

Compositions of the catalysts with two components (B01-B77)

| | | \multicolumn{8}{c|}{catalyst composition} | | | |
|---|---|---|---|---|---|---|---|---|---|---|---|---|
| | | \multicolumn{8}{c|}{component I (K I)} | | | |
| | | \multicolumn{7}{c|}{further elements [weight-% related to carrier]} | | component II | \multicolumn{2}{c|}{portion [weight-%]} |
| Example | carrier | Pd | Ru | Rh | Pt | Fe | Pr | Ce | K | Ba | (K II) | K I | K II |
| B01 | $ZrO_2$ | 2 | | | | | | 5 | | | beta-zeolite | 70 | 30 |
| B02 | $ZrO_2$ | 1.6 | 0.4 | | | | | 5 | | | beta-zeolite | 70 | 30 |
| B03 | $ZrO_2$ | 1.6 | | 0.4 | | | | 5 | | | beta-zeolite | 70 | 30 |
| B04 | $ZrO_2$ | 1.6 | | | 0.4 | | | 5 | | | beta-zeolite | 70 | 30 |
| B05 | $ZrO_2$ | 2 | | | | 2 | | 5 | | | beta-zeolite | 70 | 30 |
| B06 | $ZrO_2$ | 1.6 | 0.4 | | | 2 | | 5 | | | beta-zeolite | 70 | 30 |
| B07 | $ZrO_2$ | 1.6 | | 0.4 | | 2 | | 5 | | | beta-zeolite | 70 | 30 |
| B08 | $ZrO_2$ | 1.6 | | | 0.4 | 2 | | 5 | | | beta-zeolite | 70 | 30 |
| B09 | $ZrO_2$ | 2 | | | | 2 | 5 | 5 | | | beta-zeolite | 70 | 30 |
| B10 | $ZrO_2$ | 1.6 | 0.4 | | | 2 | 5 | 5 | | | beta-zeolite | 70 | 30 |
| B11 | $ZrO_2$ | 1.6 | | 0.4 | | 2 | 5 | 5 | | | beta-zeolite | 70 | 30 |
| B12 | $ZrO_2$ | 1.6 | | | 0.4 | 2 | 5 | 5 | | | beta-zeolite | 70 | 30 |
| B13 | $ZrO_2$ | 2 | | | | | | 10 | | | beta-zeolite | 70 | 30 |
| B14 | $ZrO_2$ | 1.6 | 0.4 | | | | | 10 | | | beta-zeolite | 70 | 30 |
| B15 | $ZrO_2$ | 1.6 | | 0.4 | | | | 10 | | | beta-zeolite | 70 | 30 |
| B16 | $ZrO_2$ | 1.6 | | | 0.4 | | | 10 | | | beta-zeolite | 70 | 30 |
| B17 | $ZrO_2$ | 2 | | | | 2 | | 10 | | | beta-zeolite | 70 | 30 |
| B18 | $ZrO_2$ | 1.6 | 0.4 | | | 2 | | 10 | | | beta-zeolite | 70 | 30 |
| B19 | $ZrO_2$ | 1.6 | | 0.4 | | 2 | | 10 | | | beta-zeolite | 70 | 30 |
| B20 | $ZrO_2$ | 1.6 | | | 0.4 | 2 | | 10 | | | beta-zeolite | 70 | 30 |
| B21 | $ZrO_2$ | 2 | | | | 2 | 5 | 10 | | | beta-zeolite | 70 | 30 |
| B22 | $ZrO_2$ | 1.6 | 0.4 | | | 2 | 5 | 10 | | | beta-zeolite | 70 | 30 |
| B23 | $ZrO_2$ | 1.6 | | 0.4 | | 2 | 5 | 10 | | | beta-zeolite | 70 | 30 |
| B24 | $ZrO_2$ | 1.6 | | | 0.4 | 2 | 5 | 10 | | | beta-zeolite | 70 | 30 |
| B25 | $ZrO_2$ | 2 | | | | | | 20 | | | beta-zeolite | 70 | 30 |
| B26 | $ZrO_2$ | 1.6 | 0.4 | | | | | 20 | | | beta-zeolite | 70 | 30 |
| B27 | $ZrO_2$ | 1.6 | | 0.4 | | | | 20 | | | beta-zeolite | 70 | 30 |
| B28 | $ZrO_2$ | 1.6 | | | 0.4 | | | 20 | | | beta-zeolite | 70 | 30 |
| B29 | $ZrO_2$ | 2 | | | | 2 | | 20 | | | beta-zeolite | 70 | 30 |
| B30 | $ZrO_2$ | 1.6 | 0.4 | | | 2 | | 20 | | | beta-zeolite | 70 | 30 |
| B31 | $ZrO_2$ | 1 | | | | | | 5 | | | beta-zeolite | 70 | 30 |
| B32 | $ZrO_2$ | 1 | | | | | | 5 | | | ZSM-5 | 70 | 30 |
| B33 | $ZrO_2$ | 0.9 | 0.1 | | | | | 5 | | | ZSM-5 | 70 | 30 |
| B34 | $ZrO_2$ | 0.9 | | 0.1 | | | | 5 | | | ZSM-5 | 70 | 30 |
| B35 | $ZrO_2$ | 0.9 | 0.1 | | | 1 | | 5 | | | beta-zeolite | 70 | 30 |
| B36 | $ZrO_2$ | 2 | | | | | | | | | beta-zeolite | 50 | 50 |
| B37 | $ZrO_2$ | 2 | | | | 2 | | | | | beta-zeolite | 50 | 50 |
| B38 | $ZrO_2$ | 1.6 | | | 0.4 | | | | | | beta-zeolite | 50 | 50 |
| B39 | $ZrO_2$ | 1.6 | 0.4 | | | | | | | | beta-zeolite | 50 | 50 |
| B40 | $ZrO_2$ | 1.6 | | 0.4 | | | | | | | beta-zeolite | 50 | 50 |
| B41 | $ZrO_2$ | 2 | | | | | | 5 | | | beta-zeolite | 50 | 50 |
| B42 | $ZrO_2$ | 2 | | | | 2 | | 5 | | | beta-zeolite | 50 | 50 |

TABLE 1-continued

Compositions of the catalysts with two components (B01-B77)

catalyst composition component I (K I)

| Example | carrier | further elements [weight-% related to carrier] | | | | | | | | | component II (K II) | portion [weight-%] | |
|---|---|---|---|---|---|---|---|---|---|---|---|---|---|
| | | Pd | Ru | Rh | Pt | Fe | Pr | Ce | K | Ba | | K I | K II |
| B43 | ZrO$_2$ | 1.6 | | | 0.4 | | | 5 | | | beta-zeolite | 50 | 50 |
| B44 | ZrO$_2$ | 1.6 | 0.4 | | | | | 5 | | | beta-zeolite | 50 | 50 |
| B45 | ZrO$_2$ | 1.6 | 0.4 | | | | | 5 | | 2 | beta-zeolite | 50 | 50 |
| B46 | CeO$_2$ | 2 | | | | | | | | | beta-zeolite | 50 | 50 |
| B47 | CeO$_2$ | 2 | | | | | | | | | beta-zeolite | 70 | 30 |
| B48 | CeO$_2$ | 2 | | | | | | | | | Wessalith HY25/5 | 50 | 50 |
| B49 | CeO$_2$ | 2 | | | | | | | | | ZSM-5 | 50 | 50 |
| B50 | CeO$_2$ | 1.6 | 0.4 | | | | | | | | beta-zeolite | 50 | 50 |
| B51 | CeO$_2$ | 1.6 | 0.4 | | | | | | | | beta-zeolite | 70 | 30 |
| B52 | CeO$_2$ | 1.6 | 0.4 | | | | | | | | Wessalith HY25/5 | 50 | 50 |
| B53 | CeO$_2$ | 1.6 | 0.4 | | | | | | | | ZSM-5 | 50 | 50 |
| B54 | CeO$_2$ | 1.6 | | 0.4 | | | | | | | beta-zeolite | 50 | 50 |
| B55 | CeO$_2$ | 1.6 | | 0.4 | | | | | | | beta-zeolite | 70 | 30 |
| B56 | CeO$_2$ | 1.6 | | 0.4 | | | | | | | Wessalith HY25/5 | 50 | 50 |
| B57 | CeO$_2$ | 1.6 | | 0.4 | | | | | | | ZSM-5 | 50 | 50 |
| B58 | CeO$_2$ | 1.6 | | | 0.4 | | | | | | beta-zeolite | 50 | 50 |
| B59 | CeO$_2$ | 1.6 | | | 0.4 | | | | | | beta-zeolite | 70 | 30 |
| B60 | CeO$_2$ | 1.6 | | | 0.4 | | | | | | Wessalith HY25/5 | 50 | 50 |
| B61 | CeO$_2$ | 2 | | | | 2 | 5 | | | | beta-zeolite | 50 | 50 |
| B62 | CeO$_2$ | 2 | | | | 2 | 5 | | | | beta-zeolite | 70 | 30 |
| B63 | CeO$_2$ | 2 | | | | 2 | 5 | | | | Wessalith HY25/5 | 50 | 50 |
| B64 | CeO$_2$ | 2 | 0.4 | | | 2 | 5 | | | | beta-zeolite | 50 | 50 |
| B65 | CeO$_2$ | 2 | 0.4 | | | 2 | 5 | | | | beta-zeolite | 70 | 30 |
| B66 | CeO$_2$ | 2 | 0.4 | | | 2 | 5 | | | | Wessalith HY25/5 | 50 | 50 |
| B67 | CeO$_2$ | 2 | 0.4 | | | 2 | 5 | | | | ZSM-5 | 50 | 50 |
| B68 | CeO$_2$ | 2 | | 0.4 | | 2 | 5 | | | | beta-zeolite | 50 | 50 |
| B69 | CeO$_2$ | 2 | | 0.4 | | 2 | 5 | | | | beta-zeolite | 70 | 30 |
| B70 | CeO$_2$ | 2 | | 0.4 | | 2 | 5 | | | | Wessalith HY25/5 | 50 | 50 |
| B71 | CeO$_2$ | 2 | | 0.4 | | 2 | 5 | | | | ZSM-5 | 50 | 50 |
| B72 | CeO$_2$ | 2 | | | 0.4 | 2 | 5 | | | | beta-zeolite | 70 | 30 |
| B73 | CeO$_2$ | 2 | | | 0.4 | 2 | 5 | | | | Wessalith HY25/5 | 50 | 50 |
| B74 | CeO$_2$ | 2 | | | 0.4 | 2 | 5 | | | | ZSM-5 | 50 | 50 |
| B75 | CeO$_2$ | 1 | | | | 1 | | | | | beta-zeolite | 50 | 50 |
| B76 | Siralox 5/170 | | | | | 2 | | | | 15 | beta-zeolite | 50 | 50 |
| B77 | Siralox 5/170 | | | 0.5 | 1.5 | | | | | 15 | beta-zeolite | 50 | 50 |

Testing of Catalysts

The measurements at the catalysts, which were used for the process, were carried out in fixed bed laboratory reactors made from stainless steel with simulated exhaust gas from an engine. The catalysts were tested in the cyclic rich/lean operational mode in the temperature range between 150 and 400° C.

The test parameters were as follows:

| Test conditions I | |
|---|---|
| rich-lean adjustments: | 2 s rich/60 s lean |
| composition of the gas mixture: | |
| lean: | 300 vppm NO, 1000 vppm CO, 100 vppm propene, 10% O$_2$, 5% H$_2$O, balance - N$_2$ |
| rich: | 0.03% O$_2$, ~6% CO, ~2% H$_2$ |
| gas flow rate: | 45 L/h |
| catalyst mass: | 0.15-0.5 g |

| Test conditions II | |
|---|---|
| rich-lean adjustments: | 2 s rich/60 s lean |
| composition of the gas mixture: | |
| lean: | 300 vppm NO, 1000 vppm CO, 100 vppm propene, 10% O$_2$, balance - N$_2$ |
| rich: | 0.03% O$_2$, ~6% CO, ~2% H$_2$ |
| gas flow rate: | 45 L/h |
| catalyst mass: | 0.15-0.5 g |

The catalysts, which were applied for the process, were measured as bulk material. The application of the washcoat to a shaped body was set aside. Mostly, for the measurement of the activity, a sieve fraction with particle sizes of from 315-700 μm was used.

As reference catalyst (VB01), a commercial honeycomb shaped NO$_x$-storing catalyst was used. The reference catalyst was mortared and also used as bulk material for the activity measurement. With respect to the comparison between the reference system and the catalysts according to the invention, the masses of applied noble metal were identical in the activity measurements, respectively.

The measurement of O$_2$ was carried out with a Lambda-Meter of the Company Etas. NO$_x$ was measured with a chemiluminescence device of Company Ecophysics. The measurement of NH$_3$ was carried out under test conditions II with a mass spectrometer of the Company Balzers.

Hydrothermal Aging

The hydrothermal aging of the catalysts was carried out in a muffle furnace at a temperature of 650° C. in an air flow with 10 volume-% water vapor. Thereby, the catalysts were kept for 16 hours at said temperature and were then cooled down to room temperature.

For the evaluation of the catalysts, the average $NO_x$ rates were calculated in the rich/lean cycles at different reaction temperatures. The corresponding values for the catalysts in the fresh condition and after hydrothermal aging are summarized in the Tables 2 to 5 as well as in FIGS. 11 to 13.

TABLE 2

Results of the catalytic tests of the $NO_x$ conversion in the rich/lean operational mode at the fresh catalysts (test conditions I, amount of noble metal in the catalyst: 0.05 g)

| | Average $NO_x$ conversion in the rich-lean cycles/% | | |
|---|---|---|---|
| Example | 150° C. | 200° C. | 300° C. |
| B01 | 30 | 46 | 47 |
| B02 | 60 | 82 | 78 |
| B03 | 57 | 69 | 67 |
| B04 | 45 | 60 | 65 |
| B05 | 48 | 53 | 43 |
| B06 | 61 | 76 | 65 |
| B07 | 51 | 63 | 56 |
| B08 | 39 | 56 | 54 |
| B09 | 40 | 48 | 51 |
| B10 | 42 | 60 | 58 |
| B11 | 53 | 57 | 58 |
| B12 | 36 | 47 | 49 |
| B13 | 51 | 63 | 43 |
| B14 | 59 | 80 | 75 |
| B15 | 47 | 70 | 67 |
| B16 | 34 | 61 | 57 |
| B17 | 32 | 49 | 39 |
| B18 | 40 | 52 | 35 |
| B19 | 40 | 63 | 45 |
| B20 | 40 | 56 | 50 |
| B21 | 38 | 50 | 35 |
| B22 | 29 | 61 | 58 |
| B23 | 42 | 44 | 53 |
| B24 | 38 | 39 | 41 |
| B25 | 44 | 46 | 33 |
| B26 | 46 | 53 | 46 |
| B27 | 53 | 55 | 56 |
| B28 | 42 | 46 | 46 |
| B29 | 38 | 40 | 37 |
| B30 | 45 | 50 | 41 |
| B46 | 45 | 53 | 41 |
| B47 | 53 | 46 | 45 |
| B48 | 34 | 46 | 34 |
| B49 | 63 | 60 | 37 |
| B50 | 55 | 50 | 40 |
| B51 | 51 | 51 | 27 |
| B52 | 63 | 79 | 59 |
| B53 | 58 | 61 | 52 |
| B54 | 49 | 55 | 39 |
| B55 | 55 | 73 | 66 |
| B56 | 60 | 67 | 51 |
| B57 | 57 | 53 | 45 |
| B58 | 50 | 49 | 35 |
| B59 | 53 | 62 | 64 |
| B60 | 50 | 46 | 38 |
| B61 | 40 | 43 | 29 |
| B62 | 45 | 58 | 55 |
| B76 | 52 | 67 | 60 |
| B77 | 37 | 53 | 49 |
| VB01 | 10 | 37 | 88 |

TABLE 3

Results of the catalytic tests for the $NO_x$ conversion in the rich-lean operational mode at the fresh catalysts (test conditions I, amount of noble metal in the catalyst: 0.0025 g)

| | Average $NO_x$ conversion in the rich-lean cycles/% | | |
|---|---|---|---|
| Example | 150° C. | 200° C. | 300° C. |
| B31 | 43 | 44 | 30 |
| B32 | 44 | 45 | 30 |
| B33 | 45 | 53 | 45 |
| B34 | 41 | 44 | 37 |
| B35 | 39 | 53 | 41 |
| B36 | 18 | 25 | 26 |
| B37 | 37 | 34 | 32 |
| B38 | 19 | 30 | 44 |
| B39 | 32 | 58 | 58 |
| B40 | 35 | 46 | 51 |
| B41 | 35 | 42 | 29 |
| B42 | 36 | 45 | 32 |
| B43 | 34 | 62 | 52 |
| B44 | 54 | 87 | 70 |
| B45 | 29 | 69 | 72 |
| B75 | 45 | 58 | 45 |
| B78 | 25 | 52 | 48 |
| B79 | 43 | 71 | 85 |
| B80 | 56 | 70 | 82 |
| B81 | 58 | 80 | 92 |
| VB01 | 10 | 25 | 84 |

TABLE 4

Results of the catalytic tests for the $NO_x$ conversion in the rich/lean-operational mode at catalysts which were hydrothermally aged at 650° C. (test conditions I, amount of noble metal in the catalyst: 0.05 g)

| | Average $NO_x$ conversion in the rich-lean cycles/% | | |
|---|---|---|---|
| Example | 150° C. | 200° C. | 300° C. |
| B01 | 37 | 54 | 46 |
| B02 | 53 | 72 | 67 |
| B03 | 45 | 47 | 55 |
| B50 | 40 | 49 | 42 |
| B51 | 55 | 56 | 45 |
| B52 | 28 | 40 | 33 |
| B53 | 43 | 49 | 42 |
| B54 | 38 | 42 | 40 |
| B55 | 45 | 37 | 48 |
| B56 | 25 | 28 | 37 |
| B57 | 44 | 44 | 59 |
| B64 | 33 | 44 | 34 |
| B65 | 49 | 46 | 30 |
| B66 | 32 | 33 | 28 |
| B67 | 47 | 59 | 48 |
| VB01 | 10 | 17 | 80 |

TABLE 5

Results of the catalytic tests for the $NO_x$ conversion in the rich/lean operational mode at the hydrothermally aged catalysts (test conditions I, amount of noble metal in the catalyst: 0.025 g)

| | Average $NO_x$ conversion in the rich-lean cycles/% | | |
|---|---|---|---|
| Example | 150° C. | 200° C. | 300° C. |
| B06 | 31 | 53 | 44 |
| B14 | 30 | 58 | 53 |
| B31 | 33 | 36 | 31 |
| B32 | 38 | 40 | 31 |
| B33 | 39 | 51 | 51 |
| B34 | 40 | 44 | 35 |
| B35 | 46 | 48 | 43 |
| VB01 | 10 | 16 | 60 |

The results of the catalytic measurements show that the catalysts, which comprise the component I and II, have significantly higher $NO_x$ conversions at low exhaust gas temperatures (<300° C.) than the reference $NO_x$-storing catalysts. This applies both under fresh conditions and after hydrothermal aging.

Figure 5:
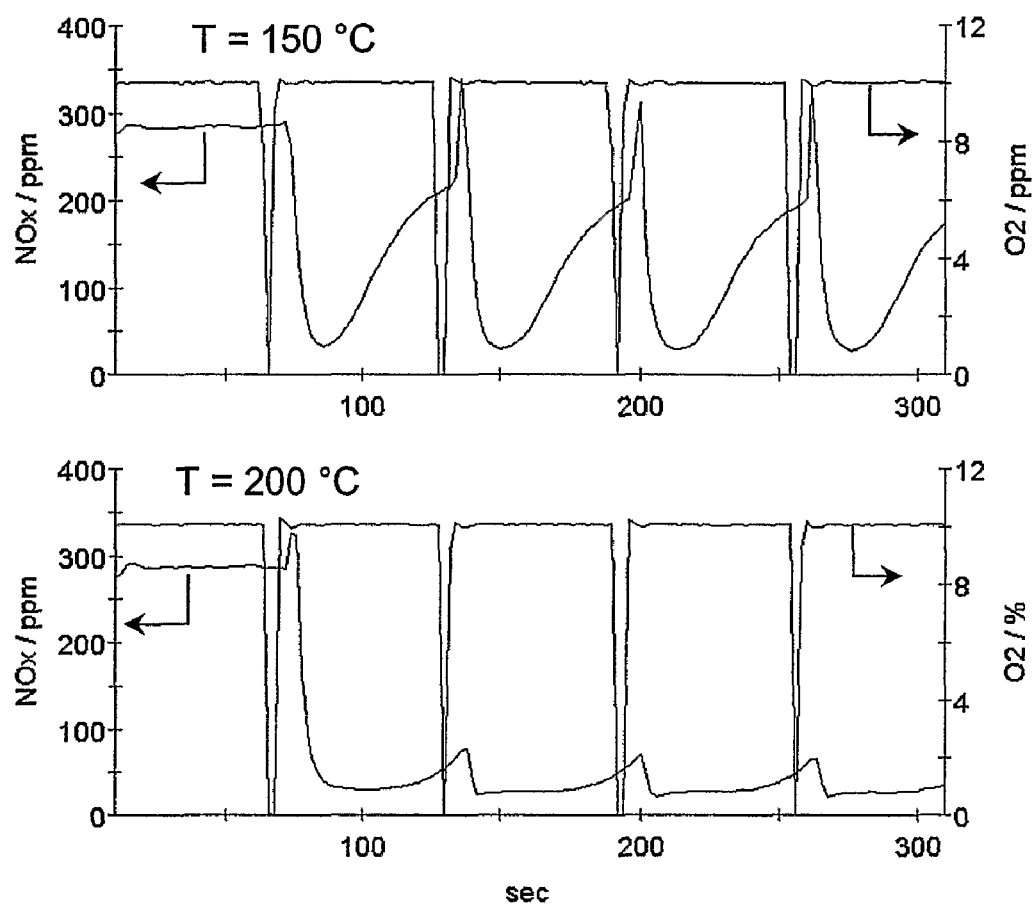
FIG. 5 shows the concentration of $NO_x$ in dependence from the time in the cyclic rich/lean operational mode using the catalyst according to the invention according to Example 2 (B2) at 150 and 200° C. (test conditions I)
Figure 6:
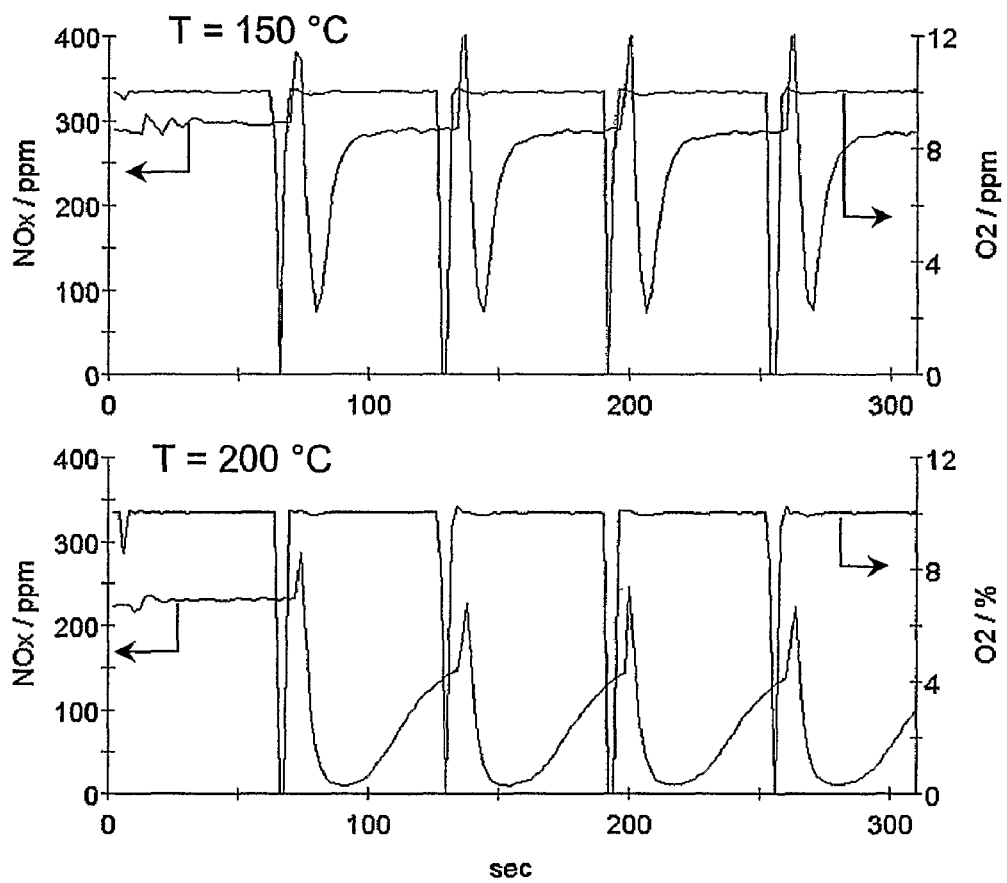
FIG. 6 shows the concentration of $NO_x$ in dependence from the time in the cyclic rich/lean operational mode using a conventional storage catalyst (reference) according to Comparison Example 1 (VB1) at 150 and 200° C. (test conditions I)

The measurements of the $NO_x$ concentrations in the rich/lean cycles, which are shown in FIGS. 5 to 6, allow a comparison of the $NO_x$ conversion between the catalyst (B2) and the conventional storing catalyst (VB1) at the exhaust gas temperatures of 150 and 200° C.

Figure 7:
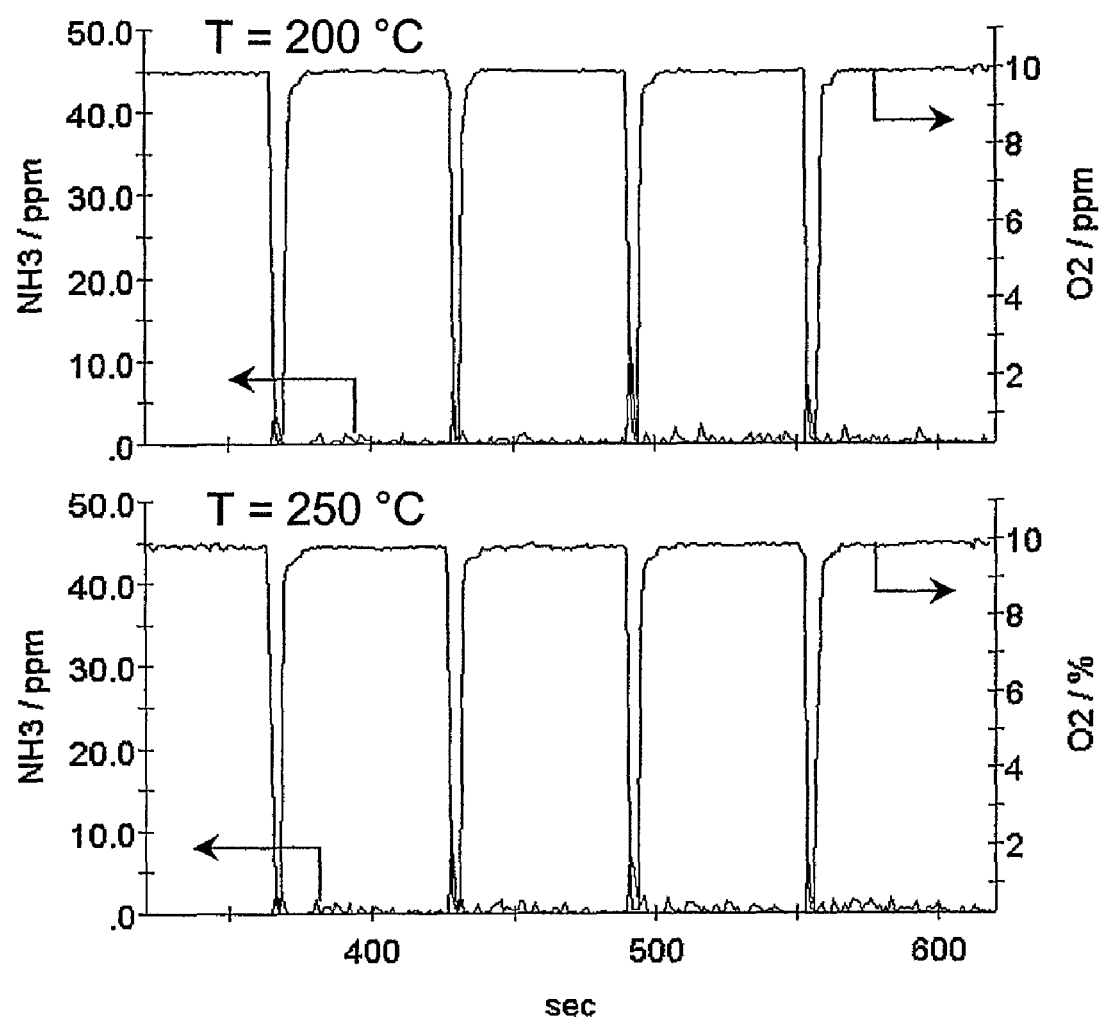
FIG. 7 shows the concentration of $NH_3$ in dependence from the time in the cyclic rich/lean operational mode using the catalyst according to the invention according to Example 2 (B2) at 200 and 250° C. (test conditions II)
Figure 8:
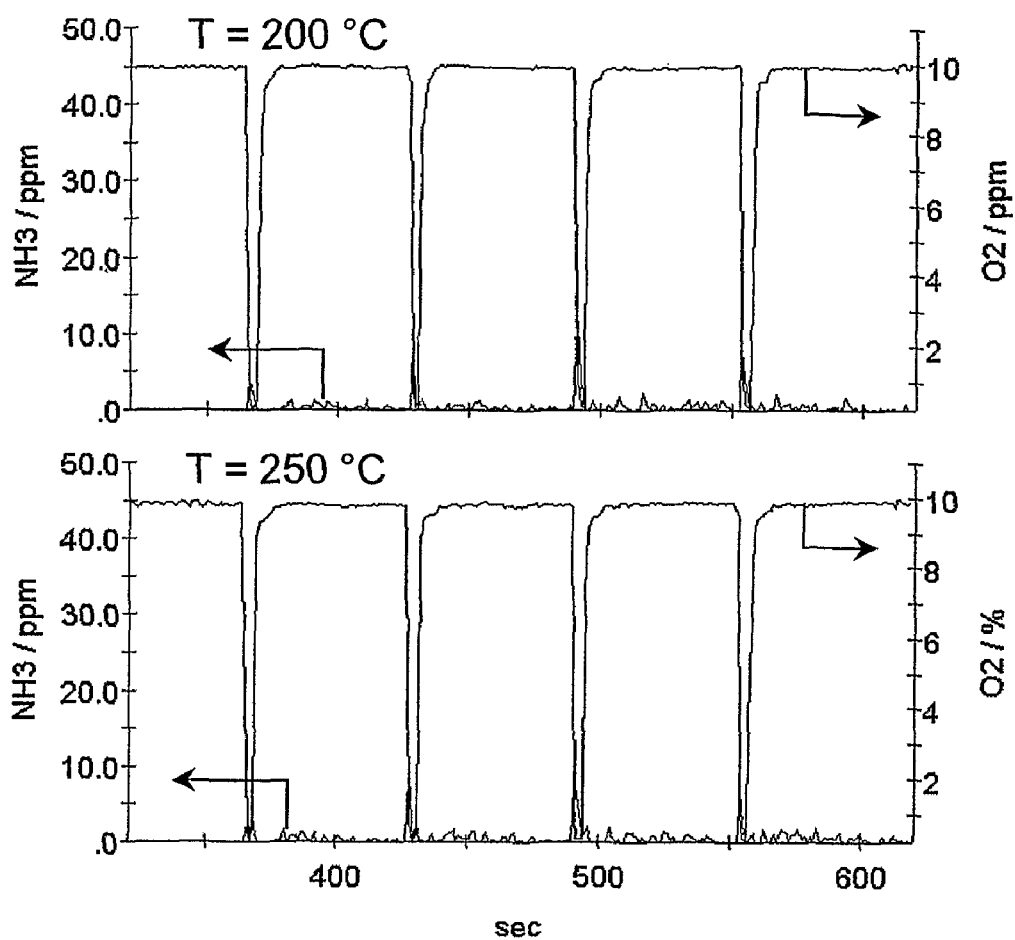
FIG. 8 shows the concentration of $NH_3$ in dependence from the time in the cyclic rich/lean operational mode using the catalyst according to the invention according to Example 3 (B3) at 200 and 250° C. (test conditions II)

The FIGS. 7 to 8 show the generation of $NH_3$ at the catalysts.

Figure 9:
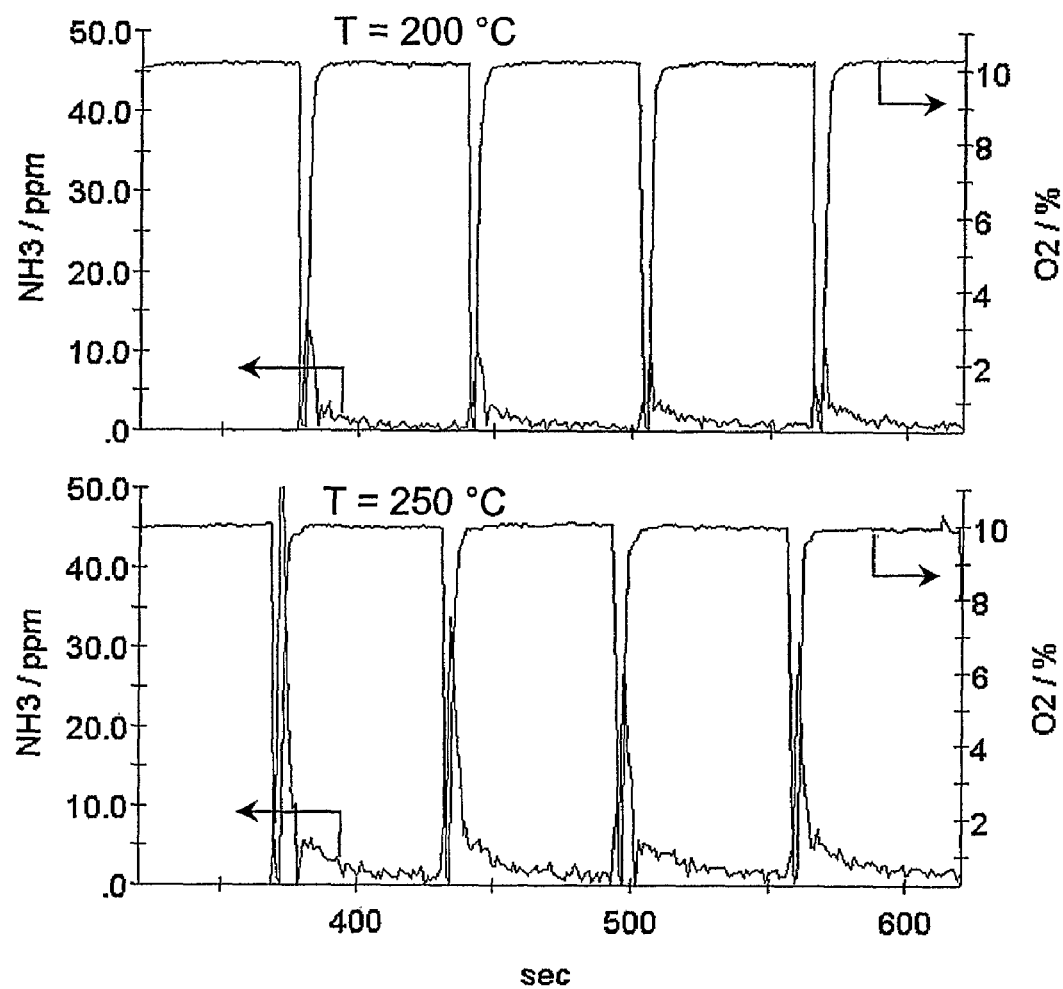
FIG. 9 shows the concentration of $NH_3$ in dependence from the time in the cyclic rich/lean operational mode using a conventional storage catalyst (reference) according to Comparison Example 01 (VB01) at 200 and 250° C. (test conditions II)
Figure 10:
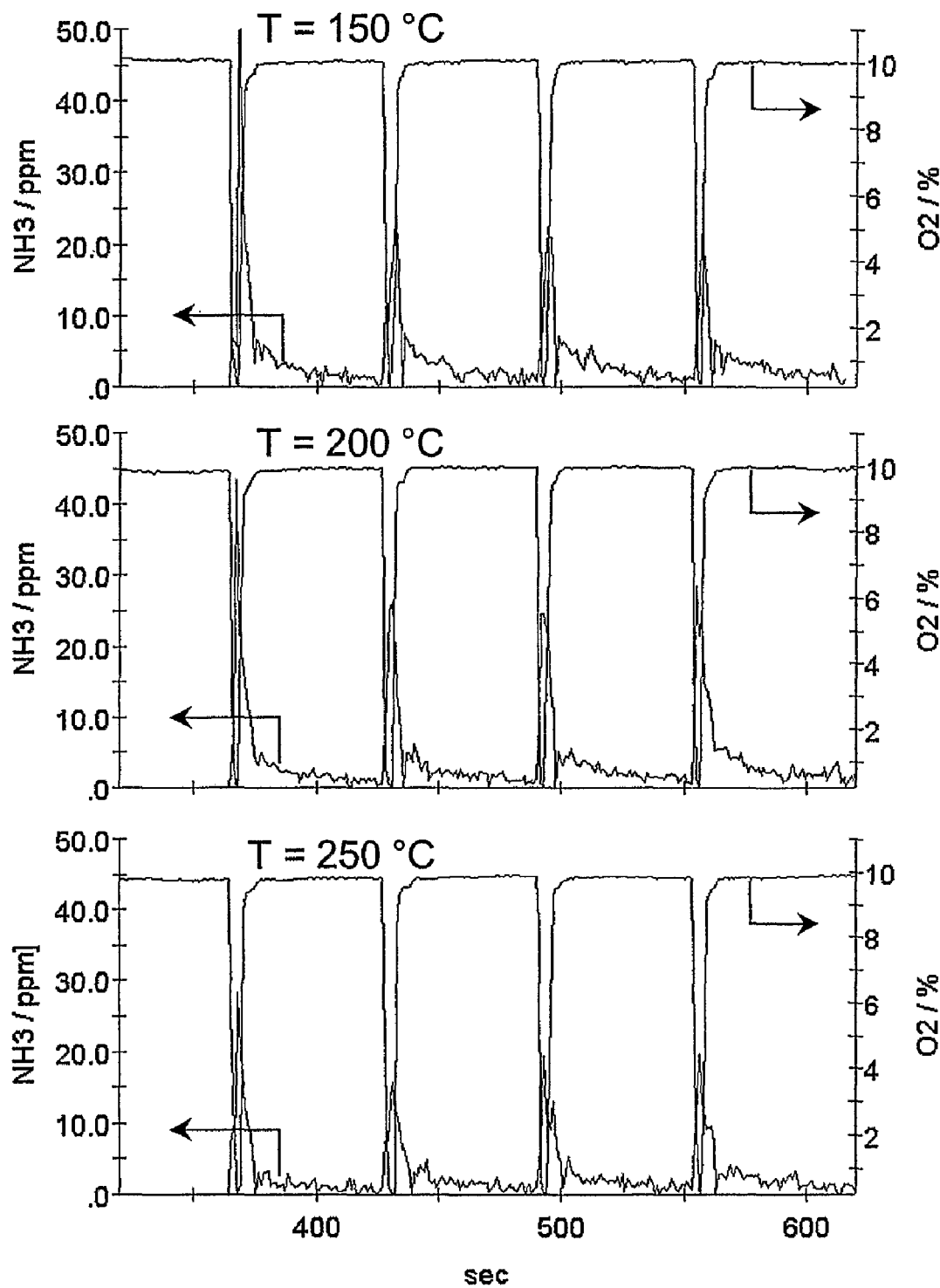
FIG. 10 shows the concentration of $NH_3$ in dependence from the time in the cyclic rich/lean operational mode using the storing component (KI) of the catalyst according to the invention according to Comparison Example 02 (VB02) at 150, 200 and 250° C. (test conditions II)

FIG. 9 shows the formation of $NH_3$ at the conventional storing catalyst (VB01).

The measurements show clearly that
(i) the catalysts, which contain the $NO_x$- and $NH_3$-storing components do not show $NH_3$ emissions compared to the $NO_x$-storing catalyst; and additionally
(ii) in particular at low exhaust gas temperatures ensure a more efficient removal of $NO_x$.

Figure 11:
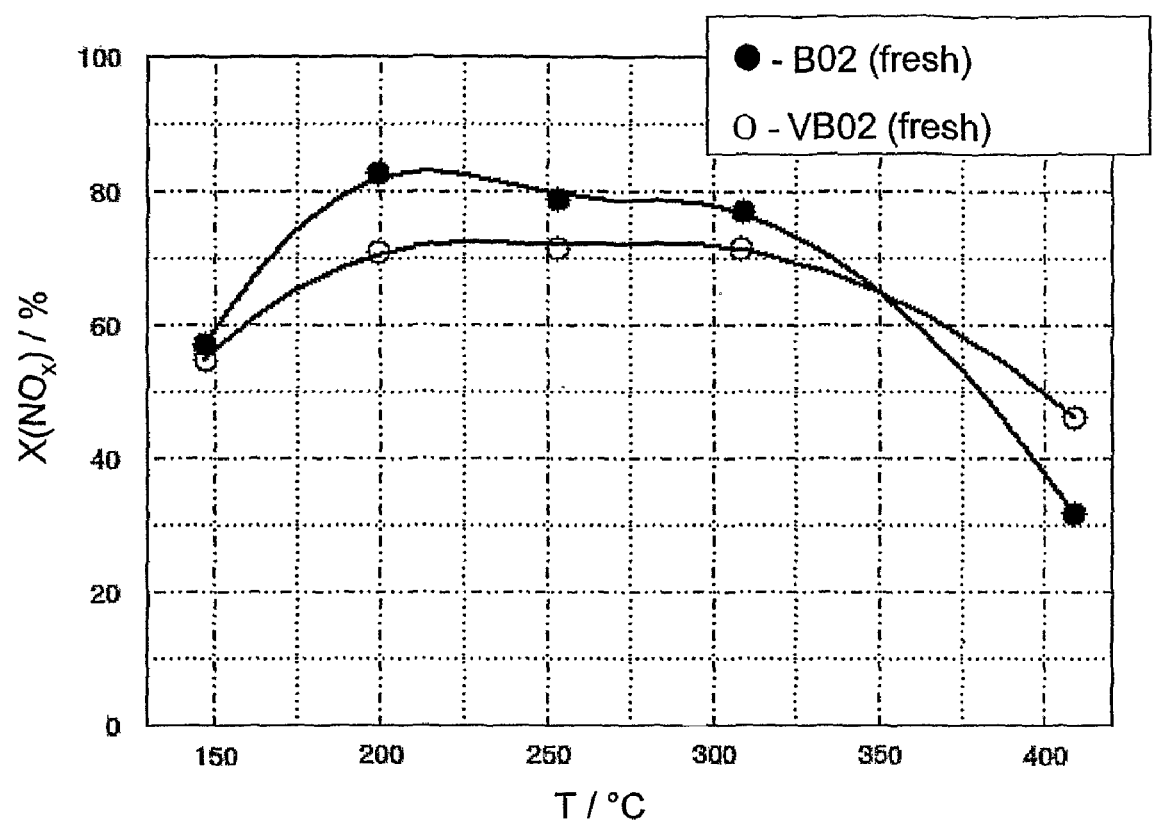
FIG. 11 shows the average $NO_x$ conversion in the rich/lean cycles in dependence from the reaction temperature under test conditions I at the fresh catalysts according to Example 2 (B02) and Comparison Example 2 (VB02)
Figure 12:
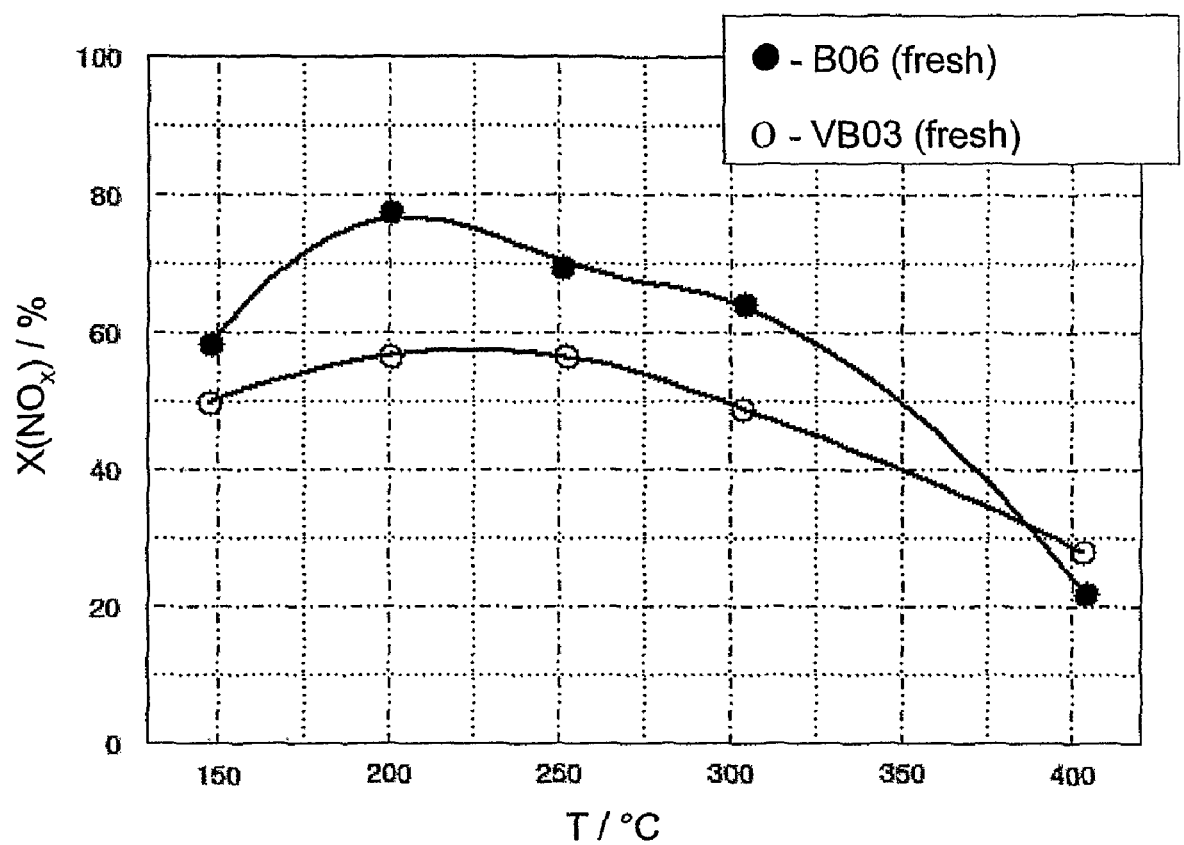
FIG. 12 shows the average $NO_x$ conversion in the rich/lean cycles in dependence from the reaction temperature under test conditions I at the fresh catalysts according to Example 6 (B06) and comparison example 3 (VB03)

The catalysts according to the invention contain a component based on zeolite, which functions both as $NH_3$-storing component and as SCR-catalyst. The FIGS. 11 and 12 show the comparison of the $NO_x$ conversion between the catalysts (B02 and B06) and the storing components (KI without using a zeolite component (VB02 and VB03).

Figure 13:
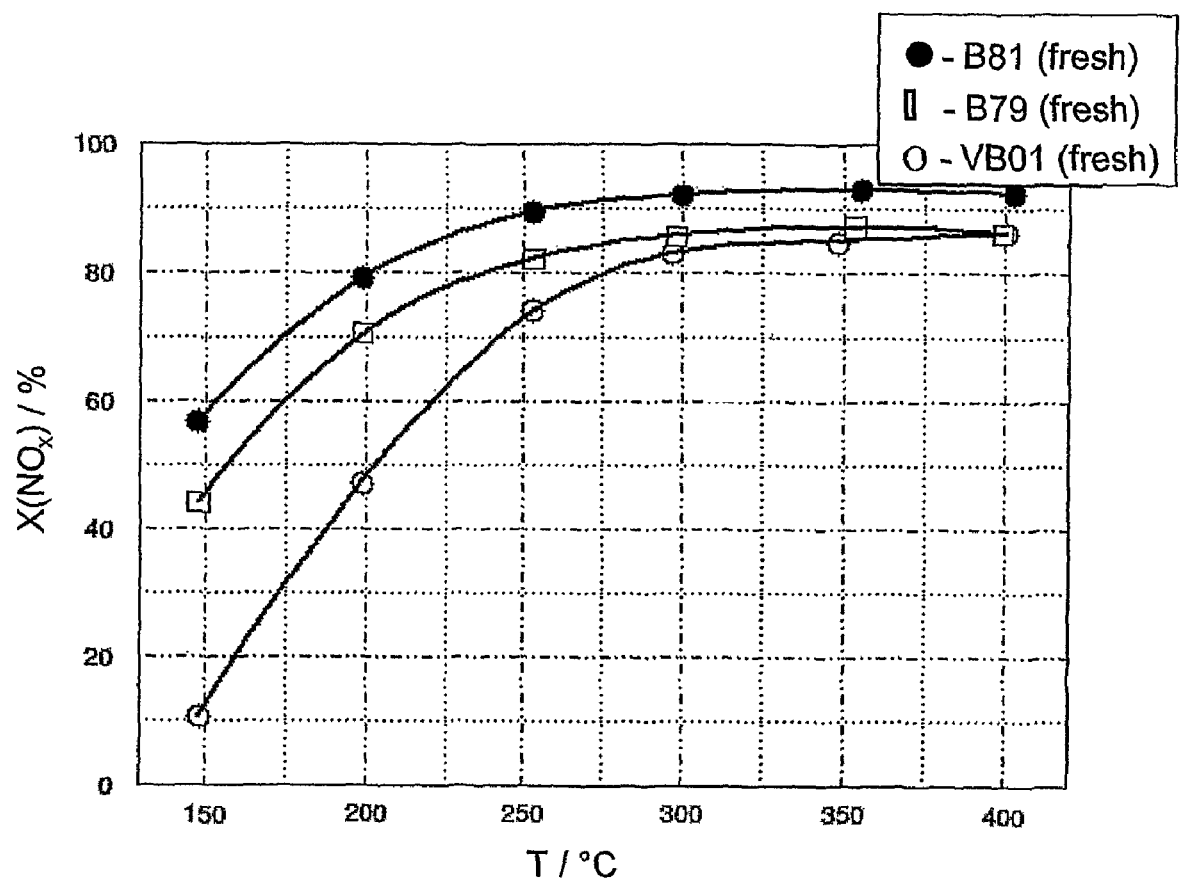
FIG. 13 shows the average $NO_x$ conversion in the rich/lean cycles in dependence from the reaction temperature under test conditions I at the fresh catalysts according to Examples 79 (B79), Example 81 (B81) and Comparison Example 1 (VB01).

The results, which are illustrated in FIG. 13 show that by using a mechanical mixture of the catalysts, which contain the $NO_x$- and $NH_3$-storing components with a conventional $NO_x$-storing catalyst (B79 and B81), an improvement of the $NO_x$ conversion in the temperature range between 150 and 400° C. was achieved in comparison to the reference $NO_x$-storing catalyst.

The invention claimed is:

1. A process for removing $NO_R$ from exhaust gas of a combustion engine, comprising:
   (i) storing $NO_x$, by a $NO_x$ sorbent, under lean exhaust gas conditions;
   (ii) catalyzing, by a $NO_x$-reducing catalyst, in situ reduction of the stored $NO_x$ to produce $NH_3$ under rich exhaust gas conditions;
   (iii) storing, by a $NH_3$ sorbent, under rich exhaust gas conditions, the produced $NH_3$; and
   (iv) catalyzing, by a $NH_3$ selective catalytic reduction (SCR) catalyst, reaction of the stored $NH_3$ with $NO_x$ under lean exhaust gas conditions to yield $N_2$;
   steps (i)-(iv) occurring simultaneously, with the $NO_x$ sorbent, the $NO_x$-reducing catalyst, the $NH_3$ sorbent and the SCR catalyst being in physical contact with each other in the form of a mixture of said sorbents and catalysts; and
   the mixture further including at least one material from group (1) and at least one material from group (2), with the amount of the material from group (2) being in the range of 10-75 weight-% of the total mixture and functioning as an acidic solid for absorbing ammonia, in which:
      group (1) consists of palladium on a carrier oxide, with the carrier oxide consisting of at least one of zirconium oxide, cerium oxide, aluminum oxide and silica alumina oxide; and
      group (2) consists of zeolites, heteropoly acids, sulfated zirconium oxides, zirconium phosphates.

2. The process of claim 1 wherein the mixture is present on a substrate.

3. The process of claim 1 wherein the $NH_3$ sorbent and the SCR catalyst are the same.

4. The process of claim 1 wherein for the storing of $NO_x$ the sorbents and catalysts are applied, which, due to their chemical properties, are able to interact with nitric oxides.

5. The process of claim 1 wherein the mixture is applied onto a substrate selected from honeycomb structures, pellets, beads, and extrudates.

6. The process of claim 1 wherein the mixture includes at least one material that is selected from a group consisting of Pt, Rh, Ir and Ru, each alone or in mixture, being present on a carrier material selected from: oxides, mixed oxides, phosphates and sulfates of Al, Si, Zr, Ti, Ce, the earth alkali metal elements and rare earth elements; heteropoly acids; zeolites; as well as mixtures thereof.

7. The process of claim 1 wherein the $NH_3$ sorbent includes at least one material selected from a group consisting of zeolites, heteropoly acids, sulfated zirconium oxides and zirconium phosphates.

8. The process of claim 1 wherein the mixture includes zeolite with a Si/Al ratio of more than 3.

9. The process of claim 1 wherein the mixture includes zeolite selected from pentasiles, Y-zeolite, USY, DAY, mordenite and zeolite-β.

10. The process of claim 1 wherein the mixture includes an iron-exchanged zeolite.

11. The process of claim 1 wherein the mixture includes one or more noble metals in the range 0.1 to 5 weight-% relative to the total mixture.

12. The process of claim 1 wherein the mixture includes an acidic solid in the range 5 to 95 weight-% relative to the total mixture.

13. The process of claim 1 wherein the mixture includes an oxide of a metal selected from alkali metal elements, earth alkali metal elements, rare earth elements, zirconium and titanium.

14. The process of claim 1 wherein the mixture includes an inorganic compound of a metal selected from V, Cr, Mn, Fe, Co, Ni, Cu, In, Ga, Ag and Sn.

15. The process of claim 1 wherein the $NO_x$ sorbent and the $NO_x$-reducing catalyst are the same.

16. The process of claim 1 wherein the $NO_x$ sorbent absorbs $NO_x$.

17. The process of claim 1 wherein the $NO_x$ sorbent adsorbs $NO_x$.

18. The process of claim 1 wherein the $NO_x$ sorbent chemisorbs $NO_x$.

19. The process of claim 1 wherein the $NH_3$ sorbent absorbs $NH_3$.

20. The process of claim 1 wherein the $NH_3$ sorbent adsorbs $NH_3$.

21. The process of claim 1 wherein the mixture is coated on a substrate as a washcoat.

22. The process of claim 1 wherein the mixture of said sorbents and catalysts is produced by mechanical mixing of said sorbents and catalysts.

23. The process of claim 1 wherein the mixture of said sorbents and catalysts is produced by mixing said sorbents and catalysts and applying the mixture in the form of mixed powders or granulates.

24. The process of claim 1 wherein the mixture of said sorbents and catalysts is produced by mixing said sorbents and catalysts and applying the mixture in the form of extrudates or shaped bodies.

* * * * *

UNITED STATES PATENT AND TRADEMARK OFFICE
CERTIFICATE OF CORRECTION

PATENT NO. : 8,087,235 B2  Page 1 of 1
APPLICATION NO. : 11/578184
DATED : January 3, 2012
INVENTOR(S) : Strehlau et al.

It is certified that error appears in the above-identified patent and that said Letters Patent is hereby corrected as shown below:

In column 29, line 37, which is the first line of claim 1, "$NO_R$" should read -- $NO_X$ --.

Signed and Sealed this
Tenth Day of April, 2012

David J. Kappos
*Director of the United States Patent and Trademark Office*